(12) United States Patent
Kuramoto

(10) Patent No.: US 7,777,609 B2
(45) Date of Patent: Aug. 17, 2010

(54) RADIO-FREQUENCY TAG COMMUNICATION DEVICE

(75) Inventor: Katsuyuki Kuramoto, Chigasaki (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 399 days.

(21) Appl. No.: 11/862,920

(22) Filed: Sep. 27, 2007

(65) Prior Publication Data
US 2008/0238620 A1    Oct. 2, 2008

Related U.S. Application Data

(63) Continuation-in-part of application No. PCT/JP2006/304811, filed on Mar. 10, 2006.

(30) Foreign Application Priority Data

Apr. 4, 2005    (JP) ............................. 2005-108064

(51) Int. Cl.
*H04Q 5/22* (2006.01)
(52) U.S. Cl. ................ 340/10.1; 340/572.1; 340/572.7; 424/422; 424/433
(58) Field of Classification Search ................ 424/422, 424/433–440, 464, 472–480; 340/572.1–572.8, 340/10.1, 10.3; 235/375, 385
See application file for complete search history.

(56) References Cited

U.S. PATENT DOCUMENTS

| | | | | |
|---|---|---|---|---|
| 5,648,767 | A * | 7/1997 | O'Connor et al. ............ | 340/928 |
| 5,752,173 | A * | 5/1998 | Tsujimoto ................... | 455/137 |
| 6,087,986 | A * | 7/2000 | Shoki et al. ................. | 342/383 |
| 6,473,055 | B2 * | 10/2002 | Kohno et al. ................ | 343/853 |
| 6,522,898 | B1 * | 2/2003 | Kohno et al. ................ | 342/383 |
| 6,600,443 | B2 * | 7/2003 | Landt ..................... | 340/825.36 |
| 6,944,437 | B2 * | 9/2005 | Yang et al. .................. | 455/323 |
| 7,310,045 | B2 * | 12/2007 | Inui ........................ | 340/572.1 |
| 7,573,389 | B2 * | 8/2009 | Kiyohara ................. | 340/572.7 |
| 2004/0112964 | A1 * | 6/2004 | Empedocles et al. ..... | 340/572.7 |

FOREIGN PATENT DOCUMENTS

| | | |
|---|---|---|
| JP | 63134979 A | 6/1988 |
| JP | 264237 U | 5/1990 |

(Continued)

*Primary Examiner*—Eric M Blount
(74) *Attorney, Agent, or Firm*—Baker Botts, LLP.

(57) ABSTRACT

A radio-frequency tag communication device arranged to transmit a transmitted signal toward a radio-frequency tag and to receive a reply signal transmitted from the radio-frequency tag in response to the transmitted signal, for thereby effecting radio communication with the radio-frequency tag, the radio-frequency tag communication device including (a) a receiver portion including a receiver antenna device which has a plurality of receiver antenna elements for receiving the reply signal from the radio-frequency tag, (b) a reception-directivity control portion which controls the directivity of reception of the receiver portion device, by controlling the phase of a received signal which is received by each of the plurality of receiver antenna elements and which may include a leakage signal which is a part of the transmitted signal, (c) a modulated-component extracting portion which extracts a modulated component of the received signal which is modulated by the radio-frequency tag, and (d) a direction detecting portion which detects the direction in which the radio-frequency tag is located, on the basis of the modulated component extracted by the modulated-component extracting portion.

10 Claims, 13 Drawing Sheets

FOREIGN PATENT DOCUMENTS

| | | |
|---|---|---|
| JP | 4203992 A | 7/1992 |
| JP | 9191209 A | 7/1997 |
| JP | 11118917 A | 4/1999 |
| JP | 11133142 A | 5/1999 |
| JP | 2002271229 A | 9/2002 |
| JP | 2003101550 A | 4/2003 |
| JP | 200448093 A | 2/2004 |
| JP | 2005303997 A | 10/2005 |
| WO | 2006106602 A1 | 10/2006 |

* cited by examiner

RADIO-FREQUENCY TAG COMMUNICATION DEVICE

CROSS REFERENCE TO RELATED APPLICATION

The present application is a Continuation-in-Part of International Application No. PCT/JP2006/304811 filed on Mar. 10, 2006, which claims the benefits of Japanese Patent Application No. 2005-108064 filed on Apr. 4, 2005, the disclosure of which is herein incorporated by reference in its entirety.

BACKGROUND OF THE INVENTION

1. Field of the Invention

The present invention relates to a radio-frequency tag communication device capable of effecting radio communication with radio-frequency tags, to write and read information on and from the radio-frequency tags.

2. Description of Related Art

There is known an RFID (Radio-Frequency Identification) communication system wherein a radio-frequency tag communication device (interrogator) reads out information, in a non-contact fashion, from small-sized radio-frequency tags (transponders) on which desired information is written. In this RFID communication system, the radio-frequency tag communication device is capable of reading out the information from the radio-frequency tags, even where the radio-frequency tags are contaminated or located at positions invisible from the radio-frequency tag communication device. For this reason, the RFID communication system is expected to be used in various fields, such as management and inspection of articles of commodity.

As one form of application of such a radio-frequency tag communication device, there is known a technique to detect the direction in which the radio-frequency tag is located or exists, For instance, Patent Document 1 discloses an RFID searching device. According to this technique, the directivity of communication with the radio-frequency tag is changed, and the direction in which the radio-frequency tag is located can be detected by detecting the direction in which the directivity of reception is the highest.

Patent Document 1: JP-2000-271229 A

According to the above-indicated prior art technique in which the directivity of communication with the radio-frequency tag is changed to detect the direction in which the directivity of reception is the highest, however, the direction in which the directivity of reception is the highest is not necessarily the direction in which the radio-frequency tag is located. Therefore, an improvement of the accuracy of detection of the direction toward the radio-frequency tag is limited. There has been a need of developing a radio-frequency tag communication device capable of highly accurately detecting the direction in which the radio-frequency tag is located.

SUMMARY OF THE INVENTION

The present invention was made in view of the background art described above. It is an object of this invention to provide a radio-frequency tag communication device which permits highly accurate detection of the direction in which the radio-frequency tag is located.

The object indicated above can be achieved according to the principle of the present invention, which provides a radio-frequency tag communication device arranged to transmit a transmitted signal toward a radio-frequency tag and to receive a reply signal transmitted from the radio-frequency tag in response to the transmitted signal, for thereby effecting radio communication with the radio-frequency tag, the radio-frequency tag communication device comprising (a) a receiver portion including a receiver antenna device which has a plurality of receiver antenna elements for receiving the reply signal from the radio-frequency tag, (b) a reception-directivity control portion configured to control a directivity of reception of the receiver portion, by controlling a phase of a received signal which is received by each of the plurality of receiver antenna elements and which may include a leakage signal which is a part of the transmitted signal, (c) a modulated-component extracting portion configured to extract a modulated component of the received signal which is modulated by the radio-frequency tag, and (d) a direction detecting portion configured to detect a direction in which the radio-frequency tag is located, on the basis of the modulated component extracted by the modulated-component extracting portion.

As described above, the radio-frequency tag communication device of the present invention comprises the receiver portion including the receiver antenna device having the receiver antenna elements for receiving the reply signal from the radio-frequency tag, the reception-directivity control portion to control the directivity of reception of the receiver portion, by controlling the phase of the received signal received by each receiver antenna element and which may include the leakage signal, the modulated-component extracting portion to extract the modulated component of the received signal which is modulated by the radio-frequency tag, and the direction detecting portion to detect the direction in which the radio-frequency tag exists, on the basis of the modulated component extracted by the modulated-component extracting portion. Thus, the present radio-frequency tag communication device can accurately detect the direction in which the radio-frequency tag is located or exists, on the basis of a reflected wave component which is a part of the reply signal which is modulated and reflected by the radio-frequency tag. In other words, the present invention provides the radio-frequency tag communication device which permits highly accurate detection of the direction in which the radio-frequency tag is located.

In a first preferred form of this invention, the direction detecting portion determines, as the direction in which the radio-frequency tag is located, a direction in which the modulated component extracted by the modulated-component extracting portion has a maximum amplitude. In this case, the direction in which the radio-frequency tag is located can be detected with high accuracy, by controlling the main lobe direction of the receiver antenna device through the reception-directivity control portion, for example.

In a second preferred form of the invention, the radio-frequency tag communication device further comprises a canceling portion configured to generate a cancel signal to be added to the received signal received by each of the plurality of receiver antenna elements, for removing from the received signal the leakage signal that is the part of the transmitted signal which part is mixed in the received signal. In this case, the leakage signal is removed from the received signal, so that the signal-to-noise ratio of the received signal can be improved, making it possible to increase the maximum distance of communication of the radio-frequency tag communication device with the radio-frequency tag.

In a third preferred form of this invention, the receiver portion includes a plurality of variable amplifying portions amplifying ratios of which are variable and which are configured to amplify the received signals respectively received by the plurality of receiver antenna elements. In this case, the resolution of a plurality of received-signal A/D converting portions provided to convert the received signals received by the respective receiver antenna elements into digital signals can be maximized.

In one advantageous arrangement of the third preferred form of the invention, the receiver portion further includes a plurality of gain-difference compensating portions configured to change amplitudes of the received signals respectively amplified by the plurality of variable amplifying portions, such that ratios of change of the amplitudes of the received signals are equal to reciprocals of the respective amplifying ratios of the plurality of variable amplifying portions. In this case, the direction in which the radio-frequency tag is located can be accurately detected with a reduced influence of noises, and without deterioration of the signal-to-noise ratio.

In another advantageous arrangement of the third preferred for of the invention, the direction detecting portion controls amplifying ratios of the plurality of variable amplifying portions such that the received signals received by the plurality of receiver antenna elements have substantially the same amplitude. In this case, the direction in which the radio-frequency tag is located can be detected on the basis of the plurality of received signals having substantially the same amplitude.

Preferably, the direction detecting portion selects one of a first operating mode and a second operating mode of the variable amplifying portions, the amplifying ratios of the variable amplifying portions being controlled in the first operating mode such that the received signals received by the respective receiver antenna elements have substantially the same amplitude, and the variable amplifying portions being controlled in the second operating mode such that the received signals received by the respective receiver antenna elements are amplified by the same amplifying ratio. In this case, the first or second operating mode of the variable amplifying portions is selected depending upon whether the radio-frequency tag communication device is operated for radio communication with the radio-frequency tag, or for detection of the direction in which the radio-frequency tag is located.

In a fourth preferred form of this invention, the radio-frequency tag communication device further comprises a modulated-component-start-position detecting portion configured to detect a start position of the modulated component which is included in the received signal and which is modulated by the radio-frequency tag, and the modulated-component extracting portion extracts, as the modulated component, a predetermined length portion of the received signal starting at the start position detected by the modulated-component-start-position detecting portion. The direction detecting portion detects the direction in which the radio-frequency tag is located, on the basis of an average amplitude of the modulated component extracted by the modulated-component extracting portion. In this case, the direction in which the radio-frequency tag is located can be detected with high accuracy.

In a fifth preferred form of the present invention, the modulated-component extracting portion extracts, as the modulated component modulated by the radio-frequency tag, a predetermined portion of an entire length of the received signal received by each of the plurality of receiver antenna elements of the receiver portion, and the direction detecting portion detects the direction in which the radio-frequency tag is located, on the basis of an average amplitude of the modulated component extracted by the modulated-component extracting portion. In this case, the direction in which the radio-frequency tag is located can be detected with high accuracy.

In a sixth preferred form of the invention, the receiver portion further includes a demodulating portion configured to convert the received signal received by each of the plurality of receiver antenna elements, into an I-phase signal and a Q-phase signal having respective phases perpendicular to each other, and the modulated-component extracting portion extracts the modulated component included in the I-phase signal, and the modulated component included in the Q-phase signal, and the direction detecting portion calculates, as an approximate amplitude value of the I-phase signal, an average of absolute values of amplitude of the modulated component included in the I-phase signal, and an approximate amplitude value of the Q-phase signal, an average of absolute values of amplitude of the modulated component included in the Q-phase signal. The direction detecting portion determines, as the direction in which the radio-frequency tag is located, a direction in which a square root of a sum of a square of the approximate amplitude value of the I-phase signal and a square of the approximate amplitude value of the Q-phase signal is maximum. In this case, the direction in which the radio-frequency tag is located can be detected with high accuracy.

BRIEF DESCRIPTION OF THE DRAWING

The above and other objects, features, advantages and industrial and technical significance of the present invention will be better understood by reading the following detailed description of a preferred embodiment of this invention, when considered in connection with the accompanying drawings, in which.

DETAILED DESCRIPTION OF THE PREFERRED EMBODIMENTS

Figure 1:
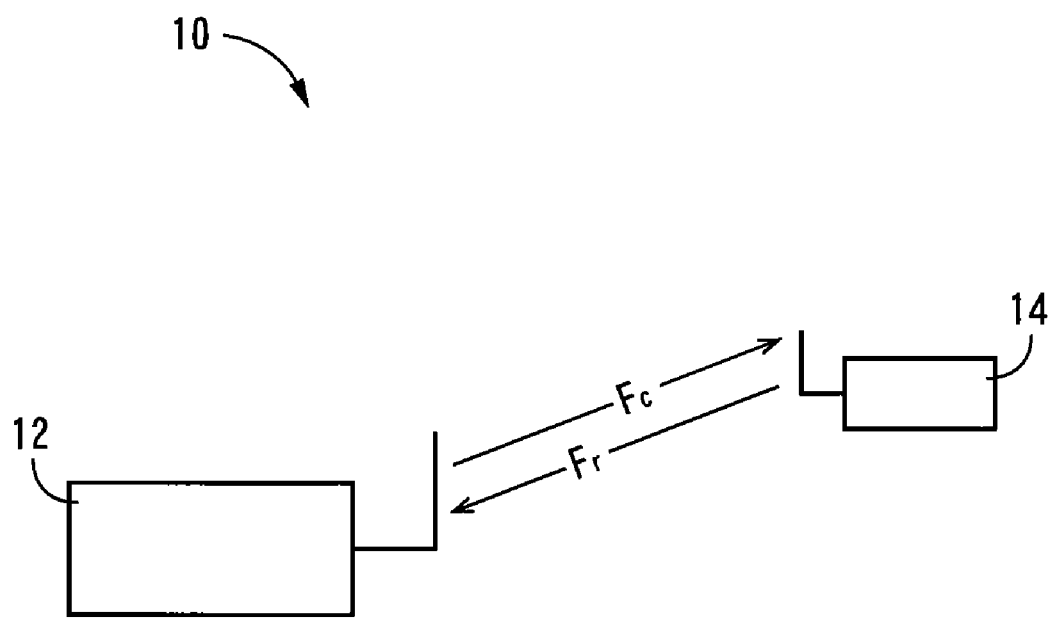
FIG. 1 is a view illustrating a radio-frequency tag communication system including a radio-frequency tag communication device constructed according to one embodiment of the present invention.

Referring to the drawings, preferred embodiments of this invention will be described in detail.

Referring first to FIG. 1, there is illustrated a radio-frequency tag communication system 10 including a radio-frequency tag communication device 12 constructed according to one embodiment of this invention, and at least one communication object in the form of at least one radio-frequency tag 12 (only one tag shown in FIG. 1) with which the radio-frequency tag communication device 12 is provided for radio communication. This radio-frequency tag communication system 10 is a so-called "RFID (Radio-Frequency Identification) system in which the radio-frequency tag communication device 12 functions as an interrogator, while each radio-frequency tag 14 functions as a transponder. Described in detail, the radio-frequency tag communication device 12 is arranged to transmit an interrogating wave $F_c$ (transmitted signal) toward the radio-frequency tag 14, and the radio-frequency tag 14 which has received the interrogating wave $F_c$ modulates the received interrogating wave $F_c$ according to a predetermined information signal (data) to generate a reply wave $F_r$ (reply signal) to be transmitted toward the radio-frequency tag communication device 12, whereby radio communication is effected between the radio-frequency tag communication device 12 and the radio-frequency tag 14.

Figure 2:
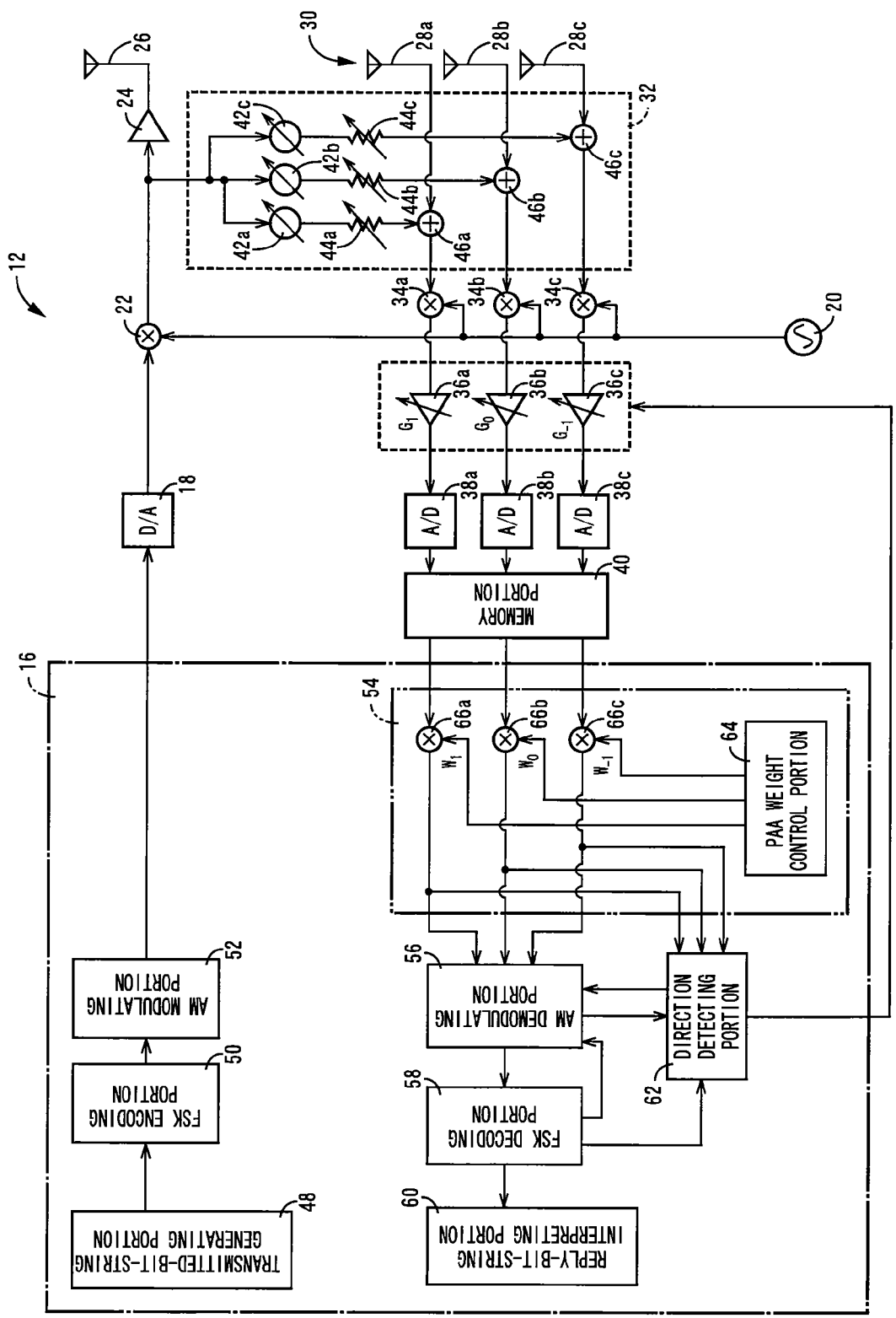
FIG. 2 is a view showing an arrangement of the radio-frequency tag communication device according to the embodiment of the invention.

Referring next to FIG. 2, there is shown an arrangement of the radio-frequency tag communication device of the present embodiment. As shown in FIG. 2, the radio-frequency tag communication device 12 is arranged to effect radio communication with the radio-frequency tag 14, for writing information on the radio-frequency tag 14, for detecting the direction in which the radio-frequency tag 14 is located or exists, and for other purposes. The radio-frequency tag communication device 12 includes: a DSP (Digital Signal Processor) 16 configured to effect digital signal processing operations to transmit a digital transmitted signal and to demodulate a reply signal received from the radio-frequency tag 14; a transmitted-signal D/A converting portion 18 configured to convert the transmitted signal received from the DSP 16, into an analog signal; a local-signal generating portion 20 configured to generate a predetermined local signal; an up converter 22 configured to increase the frequency of the analog transmitted signal received from the transmitted-signal D/A converting portion 18, by an amount equal to the frequency of the local signal generated by the local-signal generating portion 20; a transmitted-signal amplifying portion 24 configured to amplify the transmitted signal received from the up converter 22; a transmitter antenna device 26 for transmitting, as the interrogating wave $F_c$, the transmitted signal amplified by the transmitted-signal amplifying portion 24, toward the radio-frequency tag 14; a receiver antenna device 30 having a plurality of (three in the example of FIG. 2) receiver antenna elements 28a, 28b and 28c (hereinafter collectively referred to as "receiver antenna elements 28", unless otherwise specified) for receiving the reply wave $F_r$ transmitted from the radio-frequency tag 14 in response to the interrogating wave $F_c$; a canceling portion 32 configured to generate cancel signals for removing a leakage signal generated upon transmission of the transmitted signal, and to add the cancel signals to received signals respectively received by the receiver antenna elements 28; a plurality of (three in the example of FIG. 2) of down converters 34a, 34b and 34c (hereinafter collectively referred to as "down converters 34", unless otherwise specified) configured to reduce the frequencies of the received signals received by the receiver antenna elements 28, by an amount equal to the frequency of the local signal generated by the local-signal generating portion 20; a plurality of (three in the example of FIG. 2) variable amplifying portions 36a, 36b and 36c (hereinafter collectively referred to as "variable amplifying portions 36", unless otherwise specified) have respective variable amplifying ratios G1, G0 and G−1 and configured to amplify the received signals received from the respective down converters 34; a plurality of (three in the example of FIG. 2) received-signal A/D converting portions 38s, 38b and 38c (hereinafter collectively referred to as "received-signal A/D converting portions 38", unless otherwise specified) configured to convert the received signals amplified by the respective variable amplifying portions 36, into digital signals; and a received-signal storing portion in the form of a memory portion 50 configured to store the digital received signals received from the received-signal A/D converting portions 38 and to apply the digital received signals to the DSP 16, according to a command received from the DSP 16.

The canceling portion 32 includes: a plurality of (three in the example of FIG. 2) cancel-signal-phase control portions 42a, 42b and 43c (hereinafter collectively referred to as (cancel-signal-phase control portions 42", unless otherwise specified) each configured to control the phase of the transmitted signal received from the up converter 22, which is used to generate the cancel signal; a plurality of (three in the example of FIG. 2) cancel-signal-amplitude control portions 44a, 44b and 44c (hereinafter collectively referred to as "cancel-signal-amplitude control portions 44", unless otherwise specified) each configured to control the amplitude of the cancel signal the phase of which has been controlled by the corresponding cancel-signal-phase control portion 42; and a plurality of (three in the example of FIG. 2) cancel-signal adding portions 46a, 46b and 46c (hereinafter collectively referred to as "cancel-signal adding portions 46", unless otherwise specified) each configured to add the cancel signals the amplitude of which has been controlled by the corresponding cancel-signal-amplitude control portion 44, to the received signal received by the corresponding receiver antenna element 28, for thereby combining together the cancel signal and the received signal to generate a received signal to be applied to the corresponding down converter 34. Preferably, the cancel-signal-phase control portions 42 and the cancel-signal-amplitude control portions 44 are arranged to change the amount of phase shift and the amplification ratio of the cancel signals according to a control signal received from the DSP 16.

The DSP 16 described above is a so-called microcomputer system incorporating a CUP, a ROM and a RAM and configured to be operable to perform signal processing operations according to programs stored in the ROM, while utilizing a temporary data storage function of the RAM. The DSP 16 has functional portions including: a transmitted-bit-string generating portion 48 configured to generate a string of command bits corresponding to the transmitted signal to be transmitted to the radio-frequency tag 14; an FSK encoding portion 50 configured to encode the digital signal received from the transmitted-bit-string generating portion 48, according to an FSK method, for example; an AM modulating portion 52 configured to modulate the digital signal encoded by the FSK encoding portion 50, according to an AM method, and to apply the modulated digital signal to the transmitted-signal D/A converting portion 18; a PAA (Phased Array Antenna) processing portion 54 configured to effect a phased-array processing operation by multiplying the received signals read out from the memory portion 40, by respective predetermined weights; an AM demodulating portion 56 configured to demodulate the received signals subjected to the phased-array processing operation by the PAA processing portion 54, according to the AM method, for obtaining an AM-demodulated wave; an FSK decoding portion 58 configured to decode the AM-demodulated wave received from the AM demodulating portion 56, according to the FSK method; a reply-bit-string interpreting portion 60 configured to interpret the decoded signal received from the FSK decoding portion 58, for thereby reading an information signal modulated by the radio-frequency tag 14; and a direction detecting portion 62 configured to detect the direction in which the radio-frequency tag 14 is located or exists. It is noted that a receiver portion of the radio-frequency tag communication device 12 is constituted by the receiver antenna device 30, canceling portion 32, down converters 34, variable amplifying portions 36 and memory portion 40, and the PAA processing portion 54, AM demodulating portion 56, FSK decoding portion 58, reply-bit-string interpreting portion 60 and direction detecting portion 52 of the DSP 16.

The FSK decoding portion 58 described above also functions as a modulated-component-start-position detecting portion configured to detect a start position of the modulated component (reflected wave component) which is included in the received signals and which is a signal modulated by the radio-frequency tag 14. Information (timing information) indicative of the start position of the modulated component detected by the FSK decoding portion 58 is applied to the above-indicated direction detecting portion 62. The FSK decoding portion 58 is also configured to apply to the Am demodulating portion 56 an I/Q selecting command for selectively applying an output of one of an I-phase BPF 76 and a Q-phase BPF 82 of the AM demodulating portion 56 to the FSK decoding portion 58.

The PAA processing portion 54 includes: a PAA weight control portion 64 configured to calculate PAA weights to be given to the respective received signals received by the plurality of receiver antenna elements 28 of the receiver antenna device 30, on the basis of the strength of the received signals; and a plurality of (three in the example of FIG. 2) reception PAA weight multiplying portions 66a, 66b and 66c (hereinafter collectively referred to as "reception PAA weight multiplying portions "66", unless otherwise specified) configured to multiply the received signals read out from the memory portion 40, by the respective PAA weights calculated by the PAA weight control portion 64, for thereby controlling the directivity of reception of the received signals from the radio-frequency tag 14. Namely, the PAA processing portion 54 functions as a reception-directivity control portion configured to control the directivity of reception of the receiver antenna device 30. Where the transmitter antenna device 26 and the receiver antenna device 30 are disposed comparatively close to each other, as shown in FIG. 2, there is a possibility that the leakage signal which is a part of the transmitted signal is mixed with the received signals received by the receiver antenna elements 28. Although the canceling portion 32 is provided to remove or suppress the leakage signal mixed with the received signals, the received signals applied to the DSP 16 may include to some extent the leakage signal where the suppression of the leakage signal by the canceling portion 32 is not sufficient. In view of this fact, the PAA processing portion 54 is configured to multiply the received signals (which may include the leakage signal) by the suitable weights (for shifting the phases of the received signals), for thereby controlling the directivity of reception of the received signals.

Figure 3:
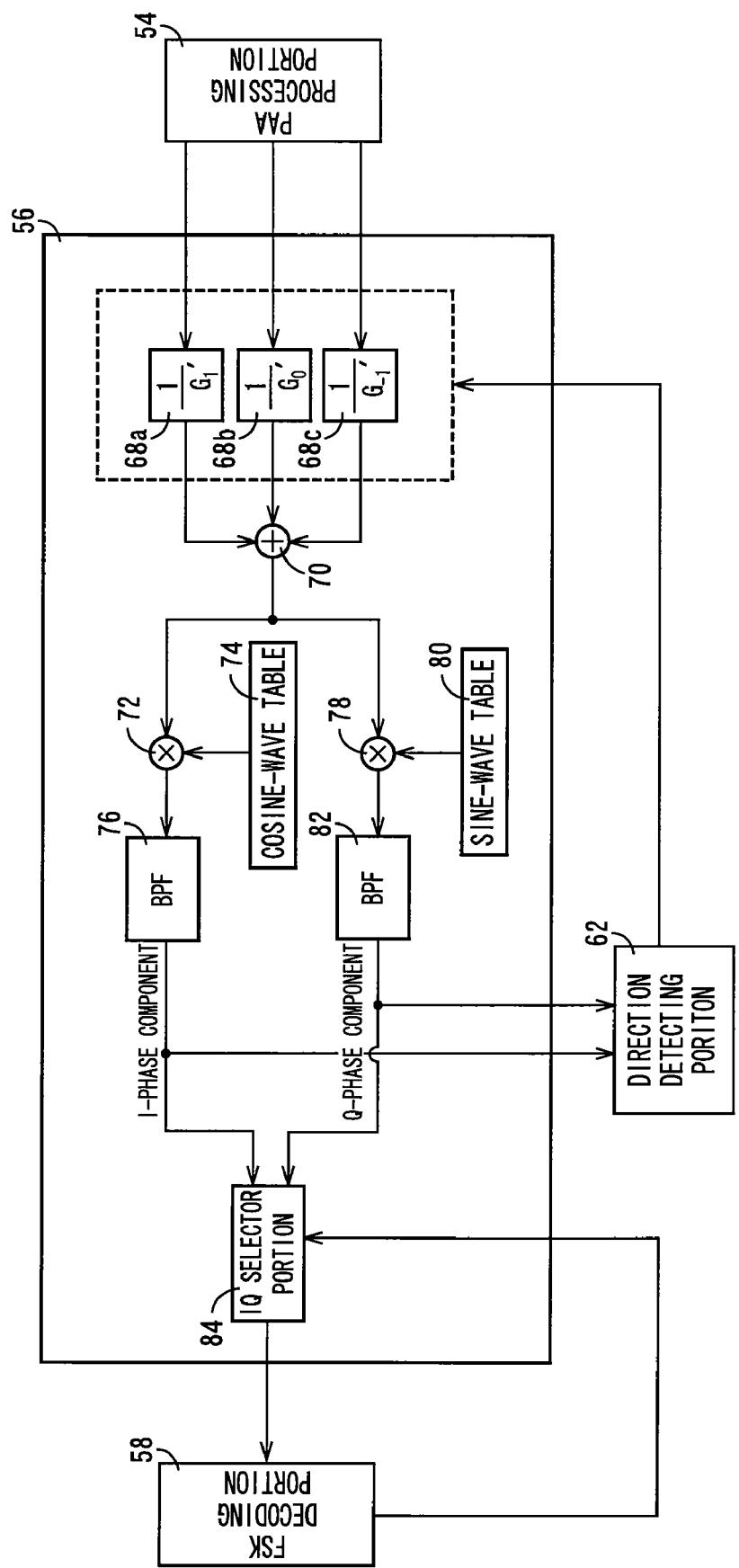
FIG. 3 is a view showing in detail an arrangement of an AM modulating portion incorporated in the radio-frequency tag communication device of FIG. 2.

Referring to FIG. 3, there is shown in detail an arrangement of the AM demodulating portion 56. As shown in FIG. 3, the AM demodulating portion 56 includes: a plurality of (three in the example of FIG. 3) gain-difference compensating portions 68a, 68b and 68c (hereinafter collectively referred to as "gain-difference compensating portions 68", unless otherwise specified) configured to compensate a difference of gains of the received signals received from the PAA processing portion 54, that is, a difference of gains of the plurality of receiver antenna elements 28; a received-signal combining portion 70 configured to combine together the received signals received from the gain-difference compensating portions 68, for obtaining a composite signal; an I-phase converting portion 72 configured to multiply the composite signal received from the received-signal combining portion 70, by a cosine wave read out from a cosine-wave table 74, for obtaining an I-phase signal; the above-indicated I-phase BPF (Band Pass Filter) 76 configured to pass only a predetermined frequency band of the I-phase signal received from the I-phase converting portion 72; a Q-phase converting portion 78 configured to multiply the composite signal received from the received-signal combining portion 70, by a sine wave read out from a sine-wave table 80, for obtaining a Q-phase signal; the above-indicated Q-phase BPF 82 configured to pass only a predetermined frequency band of the Q-phase signal received from the Q-phase converting portion 78; and an IQ selector portion 84 configured to apply the output of a selected one of the I-phase BPF 76 and Q-phase BPF 82 to the FSK decoding portion 58, according to the above-described I/Q selecting command received from the FSK decoding portion 58. It is noted that the I-phase signal generated by the I-phase BPF 76 and the Q-phase signal generated by the Q-phase BPF 82 are applied to the direction detecting portion 62 described above.

The plurality of gain-difference compensating portions 68 function as second amplifying portions (variable attenuating portions) configured to attenuate the respective received signals at respective attenuating ratios $1/G_1'$, $1/G_0'$ and $1/G_{-1}'$. These attenuating ratios (amplifying ratios) are suitably set according to a control signal received from the direction detecting portion 62. For instance, values $G_0'$, $G_1'$ and $G_{-1}'$ which determine the attenuating ratios are set to be equal to the amplifying ratios $G_0$, $G_1$ and $G_{-1}$ of the respective variable amplifying portions 36. In this case, the attenuating ratios $1/G_1'$, $1/G_0'$ and $1/G_{-1}'$ are reciprocals of the respective amplifying ratios $G_0$, $G_1$ and $G_{-1}$ of the variable amplifying portions 36. For example, $G_0'=G_1'=G_{-1}'=1$, so that the functions of the gain-difference compensating portions 68 are invalidated. The received signals generated by the gain-difference compensating portions 68 the attenuating ratios $1/G_1'$, $1/G_0'$ and $1/G_{-1}'$ of which are thus set can be suitably used for radio communication with the desired radio-frequency tag 14. Where $G_1'=G_0$, $G_0'=G_1$, and $G_{-1}'=G_{-1}$, on the other hand, the output levels of the gain-difference compensating portions 68 are set to be equal to the levels of the received signals received by the respective receiver antenna elements 28. The received signals generated by the gain-difference compensating portion 68 the attenuating ratios $1/G_1'$, $1/G_0'$ and $1/G_{-1}'$ of which are thus set can be suitably used for detecting the direction toward the desired radio-frequency tag 14. Thus, the gain-difference compensating portions 68 are operable in one of a first mode and a second mode which is selected according to the control command received from the direction detecting portion 62. In the first mode, the amplifying ratios of the gain-difference compensating portions 68 are controlled such that the received signals received by the respective receiver antenna elements 28 have substantially the same amplitude. In the second mode, the received signals received by the respective receiver antenna elements 28 are amplified by the same amplifying ratio.

Figure 4:
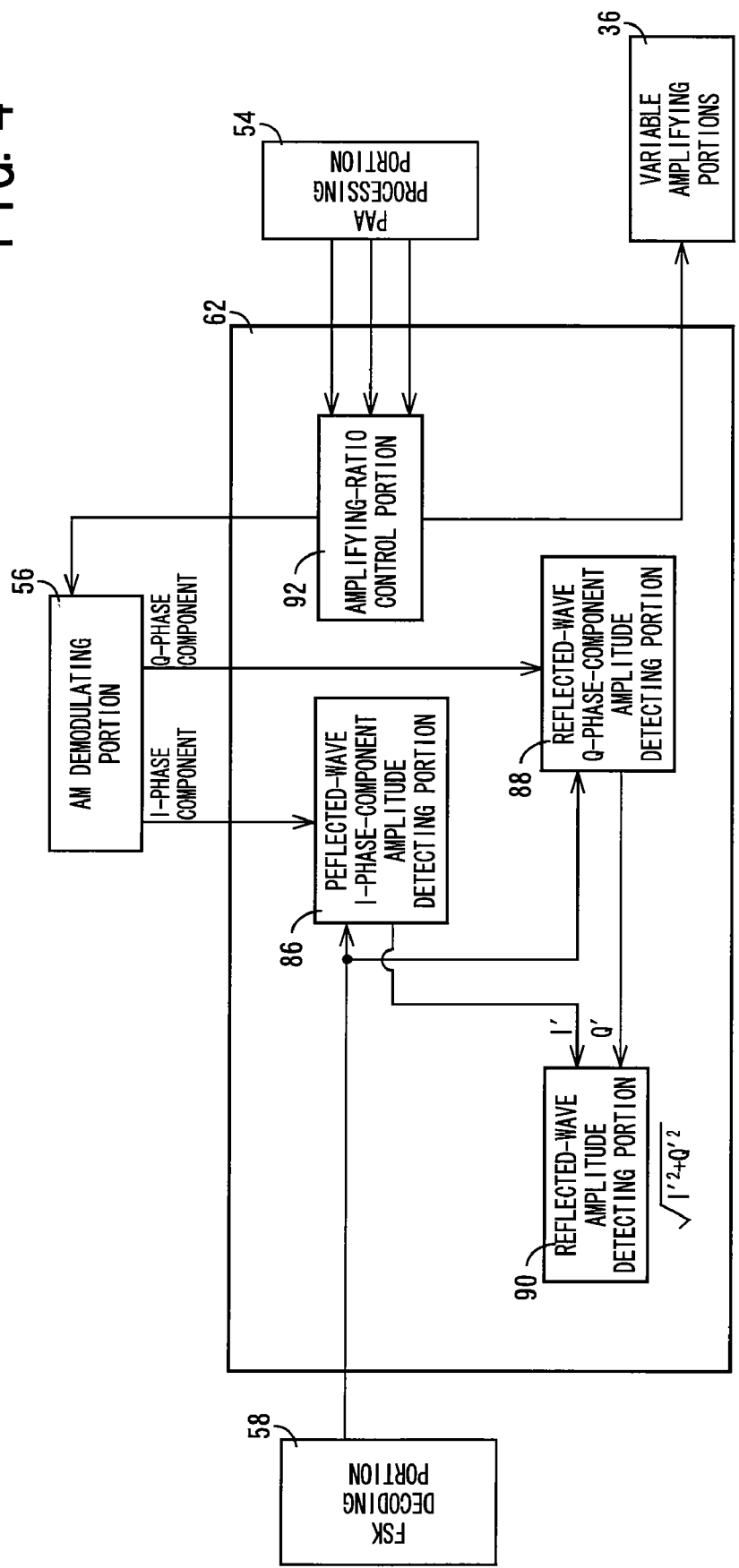
FIG. 4 is a view showing in detail an arrangement of a direction detecting portion incorporated in the radio-frequency tag communication device of FIG. 2.

Referring next to FIG. 4, there is shown in detail an arrangement of the direction detecting portion 62. As shown in FIG. 4, the direction detecting portion 62 includes: a reflected-wave-I-phase-component amplitude detecting portion 86 configured to detect an amplitude I' (approximate amplitude value) of a modulated component which is modulated by the radio-frequency tag 14 and which is included in the I-phase signal (I-phase component) received from the I-phase BPF 76 of the AM demodulating portion 56; a reflected-wave-Q-phase-component amplitude detecting portion 88 configured to detect an amplitude Q' (approximate amplitude value) of a modulated component which is modulated by the radio-frequency tag 14 and which is included in the Q-phase signal (Q-phase component) received from the Q-phase BPF 82 of the Am demodulating portion 56; a reflected-wave amplitude detecting portion 90 configured to detect the amplitude of the modulated component modulated by the radio-frequency tag 14, on the basis of the amplitude I' of the reflected-wave-I-phase component detected by the reflected-wave-I-phase-component amplitude detecting portion 86 and the amplitude Q' of the reflected-wave-Q-phase component detected by the reflected-wave-Q-phase-component amplitude detecting portion 88; and an amplifying-ratio control portion 92 configured to control the amplifying ratios $G_1$, $G_0$ and $G_{-1}$ of the variable amplifying portions 36 and the amplifying ratios (attenuating ratios) $1/G_1'$, $1/G_0'$ and $1/G_{-1}'$ of the gain-difference compensating portions 68 of the AM demodulating portion 56, on the basis of the received signals received from the PAA processing portion 54. Namely, the reflected-wave-I-phase component amplitude detecting portion 86 and the reflected-wave-Q-phase-component amplitude detecting portion 88 cooperate with each other to function as a modulated-component extracting portion configured to extract the modulated component which is modulated by the radio-frequency tag 14 and which is included in the received signals received by the receiver antenna device 30. Further, the reflected-wave amplitude detecting portion 90 substantially functions as a major part of the direction detecting portion 62, which is arranged to detect the direction in which the radio-frequency tag 14 is located, on the basis of the modulated components extracted by the reflected-wave-I-phase-component amplitude detecting portion 86 and the reflected-wave-Q-phase-component amplitude detecting portion 88.

The reflected-wave-I-phase-component amplitude detecting portion 86 is preferably arranged to detect, as the above-indicated amplitude I', an average of the absolute values of amplitude of the I-phase signal during a reply period (a reply bit period) of reply data received from the radio-frequency tag 14, while the reflected-wave-Q-phase-component amplitude detecting portion 88 is preferably arranged to detect, as the above-indicated amplitude Q', an average of the absolute values of amplitude of the Q-phase signal during the reply period of the reply data received from the radio-frequency tag 14. Further, the amplifying-ratio control portion 92 is preferably arranged to set all of the values $G_0'$, $G_1'$ and $G_{-1}'$ (determining the amplifying ratios of the gain-difference compensating portions 68) to "1" in the first operating mode, so as to amplify the received signals received by the receiver antenna elements 28 at substantially the same amplifying ratio, and to set the values $G_0'$, $G_1'$ and $G_{-1}'$ to be equal to the respective amplifying ratios $G_0$, $G_1$ and $G_{-1}$ of the variable amplifying portions 36 in the second operating mode.

Figure 5:
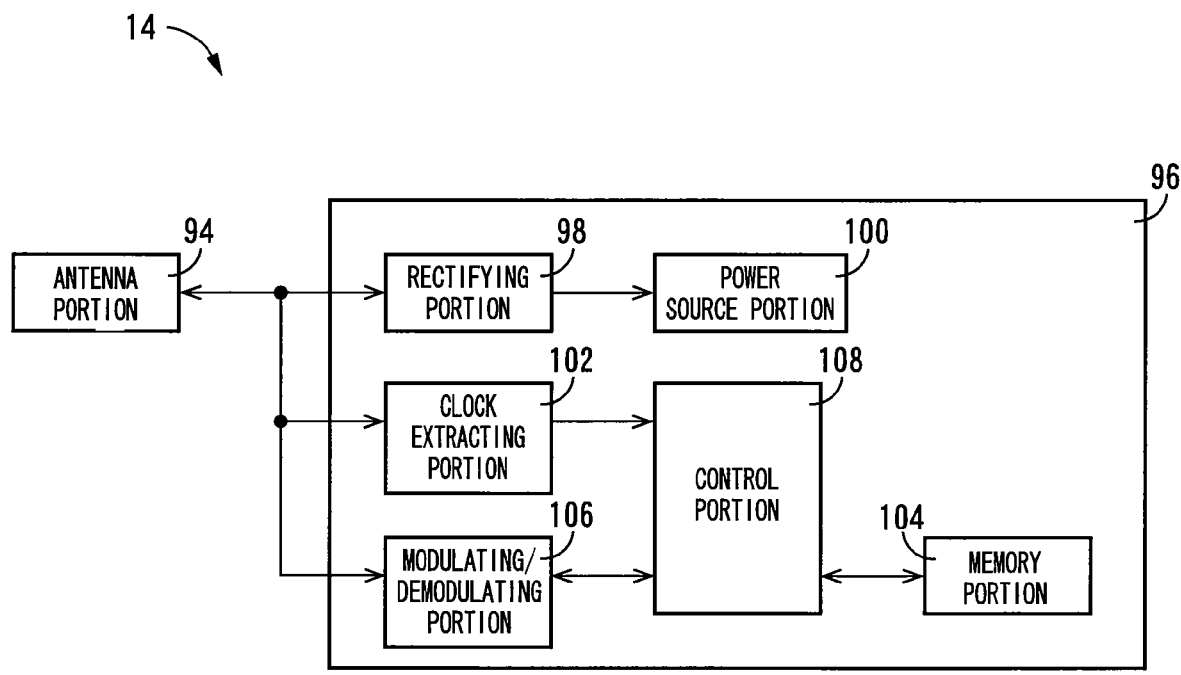
FIG. 5 is a view illustrating an arrangement of a communication object in the form of a radio-frequency tag included in the radio-frequency tag communication system, for radio communication with the radio-frequency tag communication device of FIG. 2.

Referring to FIG. 5, there is illustrated an arrangement of the radio-frequency tag 14. As shown in FIG. 5, the radio-frequency tag 14 includes an antenna portion 94 for signal transmission and reception to and from the radio-frequency tag communication device 12, and an IC-circuit portion 96 for processing signals received by the antenna portion 94. The IC-circuit portion 96 includes as functional portions thereof: a rectifying portion 98 configured to rectify the interrogating wave $F_c$ (transmitted signal) received by the antenna portion 94 from the radio-frequency tag communication device 12; a power source portion 100 for storing an energy of the interrogating wave $F_c$ rectified by the rectifying portion 98; a clock extracting portion 102 for extracting a clock signal from the carrier wave received by the antenna portion 94, and applying the extracted clock signal to a control portion 108; a memory portion 104 functioning as an information memory portion capable of storing desired information signals; a modulating/demodulating portion 106 connected to the antenna portion 94 and configured to perform signal modulation and demodulation; and the above-indicated control portion 108 configured to control the operation of the radio-frequency tag 14 via the above-described rectifying portion 98, clock extracting portion 102 and modulating/demodulating portion 106. The control portion 108 perform basic controls such as a control operation to store the desired information in the memory portion 104, as a result of the radio communication with the radio-frequency tag communication device 12, and a control operation to control the modulating/demodulating portion 106 for generating the reply wave (reply signal) $F_r$ by modulating the interrogating wave $F_c$ received by the antenna portion 94, on the basis of the information signal stored in the memory portion 104, and to transmit the generated reply wave $F_r$ as a reflected signal from the antenna portion 94.

Figure 6:
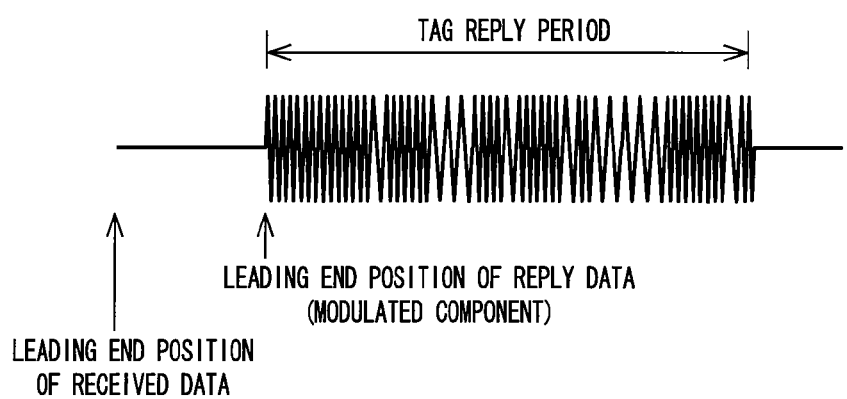
FIG. 6 is a view for explaining a manner of extracting a modulated component of a reply signal received from the radio-frequency tag of FIG. 5, on the basis of a leading end position of the reply signal.

FIG. 6 is a view for explaining the modulated component of the reply signal received from the radio-frequency tag 14. This view indicates an example of the I-phase component and the Q-phase component obtained by conversion by the AM demodulating portion 56. As described by reference to FIG. 5, the radio-frequency tag 14 is arranged to modulate the interrogating wave (carrier wave) $F_c$ received from the radio-frequency tag communication device 12, according to the information signal stored in the memory portion 104, and transmit the modulated carrier wave toward the radio-frequency tag communication device 12, as the reply wave $F_r$. This reply wave $F_r$ is the carrier wave which carries the modulated component modulated by the radio-frequency tag 14. The modulated component included in the I-phase component generated from the I-phase-component BPF 76 (or the Q-phase component generated from the Q-phase-component BPF 82) does not start at the leading end position of the received signal, but starts at a position a predetermined time after detection of the leading end position of the received signal. Namely, the modulated component continues for a predetermined period of reply data after detection of the start position of the modulated component, and ends at a trailing end position of the reply data. As described above, the FSK decoding portion 58 functions as the modulated-component-start-position detecting portion configured to detect the start position of the modulated component which is included in the received signal and which is modulated by the radio-frequency tag 14, and to apply the timing information indicative of the detected start position of the modulated component to the reflected-wave-I-phase-component amplitude detecting portion 86 and the reflected-wave-Q-phase-component amplitude detecting portion 88 of the above-indicated direction detecting portion 62. Each of those reflected-wave-I-phase-component amplitude detecting portion 86 and reflected-wave-Q-phase-component amplitude detecting portion 88 is preferably arranged to extract, as the modulated component, a predetermined length portion of the received signal starting from the start position detected by the FSK decoding portion 58, and the direction detecting portion 62 is arranged to detect the position in which the radio-frequency tag 14 is located, on the basis of an average value of the amplitudes I' and Q' of the modulated components extracted by the reflected-wave-I-phase-component amplitude detecting portion 86 and reflected-wave-Q-phase-component amplitude detecting portion 88. This aspect of the direction detecting portion 62 will be described in detail.

Figure 7:
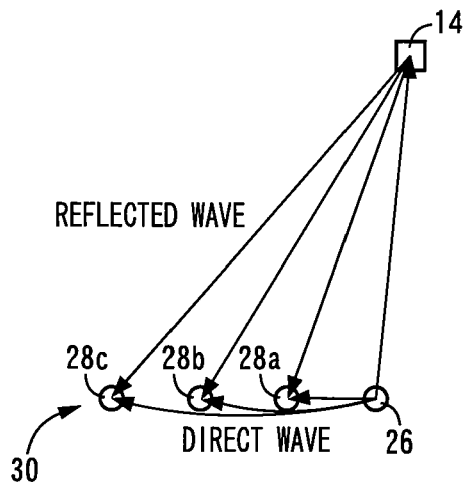
FIG. 7 is a view indicating a relative position between the radio-frequency tag of FIG. 5 and a transmitter antenna device and a receiver antenna device of the radio-frequency tag communication device of FIG. 2.
Figure 8:
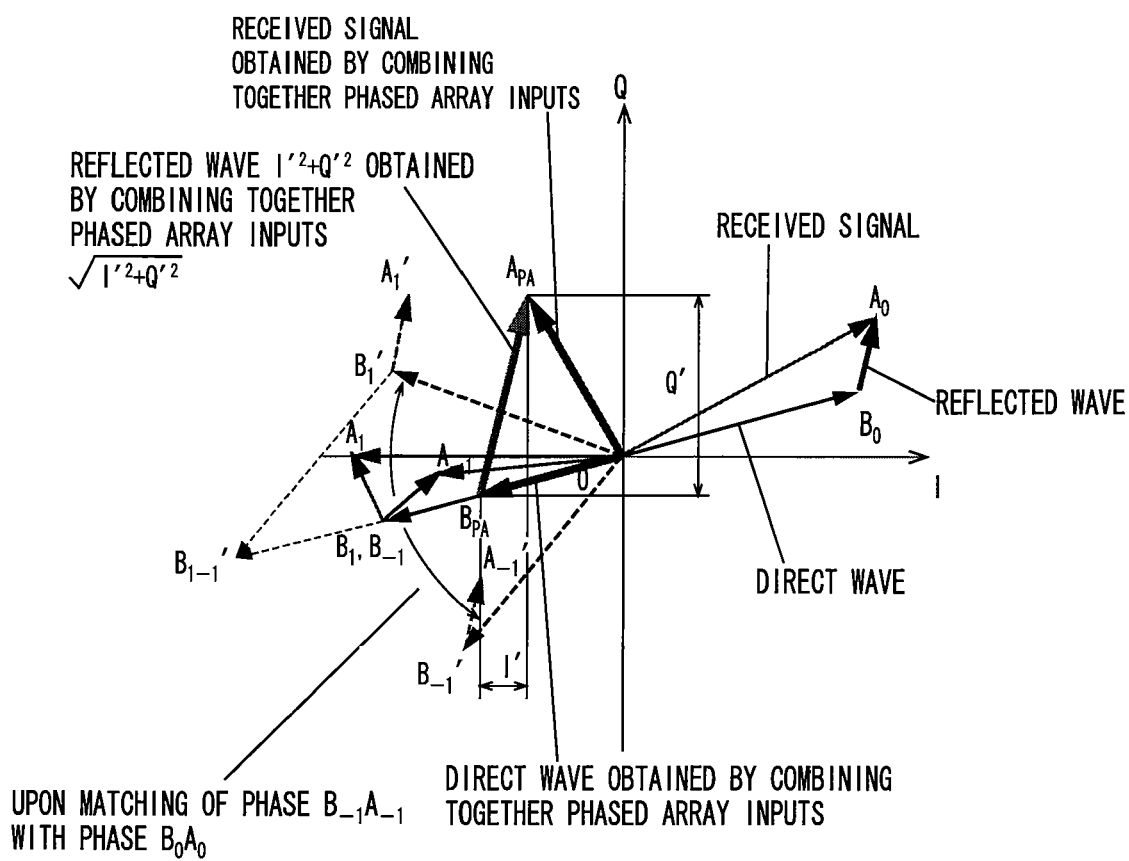
FIG. 8 is a view of vector representation in a complex plane of received signals received by the receiver antenna device in its position relative to the transmitter antenna device as indicated in FIG. 7, for explaining in detail a method of detecting the direction toward the radio-frequency tag of FIG. 5, on the basis of the modulated component of the received signal.

FIG. 7 indicates a relative position between the radio-frequency tag of FIG. 5 and a transmitter antenna device and a receiver antenna device of the radio-frequency tag communication device of FIG. 2, while FIG. 8 explains in detail a method of detecting the direction toward the radio-frequency tag 14 on the basis of the modulated component which is modulated by the received signal and which is included in the received signals received by the receiver antenna device 30. FIG. 8 is a view of vector representation in a complex plane of the received signals received by the three receiver antenna elements 28a, 28b, 28c of the receiver antenna device 30 upon reception of the interrogating wave $F_c$ from the single transmitter antenna element of the transmitter antenna device 26. In the following description, "n=0" represents the signal corresponding to the receiver antenna element 28b, "n=1" represents the signal corresponding to the receiver antenna element 28a, while "n=−1" represents the signal corresponding to the receiver antenna element 28c. As indicated in FIG. 8, the received signal $OA_n$ received by each receiver antenna element 28 consists of a direct wave component $OB_n$ received from the transmitter antenna device 26, and a reflected wave component $B_n A_n$ received from received from the radio-frequency tag 14. The received signal $OA_n$ is represented by the following equation (1). A composite signal $OA_{PA}$ obtained by the PAA processing portion 54 by combining together the three received signals the phases of which have been controlled is represented by the following equation (4) including a signal $OB_{PA}$ represented by the following equation (2) and a signal $B_{PA}A_{PA}$ represented by the following equation (3). The direction detecting portion 62 detects the direction in which the radio-frequency tag 14 is located, on the basis of the absolute value of the signal $B_{PA}A_{PA}$ represented by the equation (3), that is, $|B_{PA}A_{PA}|$ represented by the following equation (5). Described in greater detail, the reflected-wave-I-phase-component and reflected-wave-Q-phase-component amplitude detecting portions 86, 88 62 calculate, as approximate amplitude values I' and Q', average values of the absolute values of the modulated components included in the I-phase component and Q-phase component, and the reflected-wave amplitude detecting portion 90 calculates a square root ($=|B_{PA}A_{PA}|$) of a sum of the square of the approximate amplitude value I' and the square of the approximate amplitude value Q'. The direction detecting portion 62 determines the direction in which the calculated square root is maximum, as the direction in which the radio-frequency tag 14 is located or exists.

$$OA_n = OB_n + B_n A_n \tag{1}$$

$$OB_{PA} = OB_0 + OB_1' + B_{-1}' \tag{2}$$

$$B_{PA}A_{PA} = B_0 A_0 + B_1' A_1' + B_{-1}' A_{-1}' \tag{3}$$

$$OA_{PA} = OB_{PA} + B_{PA}A_{PA} \tag{4}$$

$$|B_{PA}A_{PA}| = (I'^2 + Q'^2)^{1/2} \tag{5}$$

Figure 9:
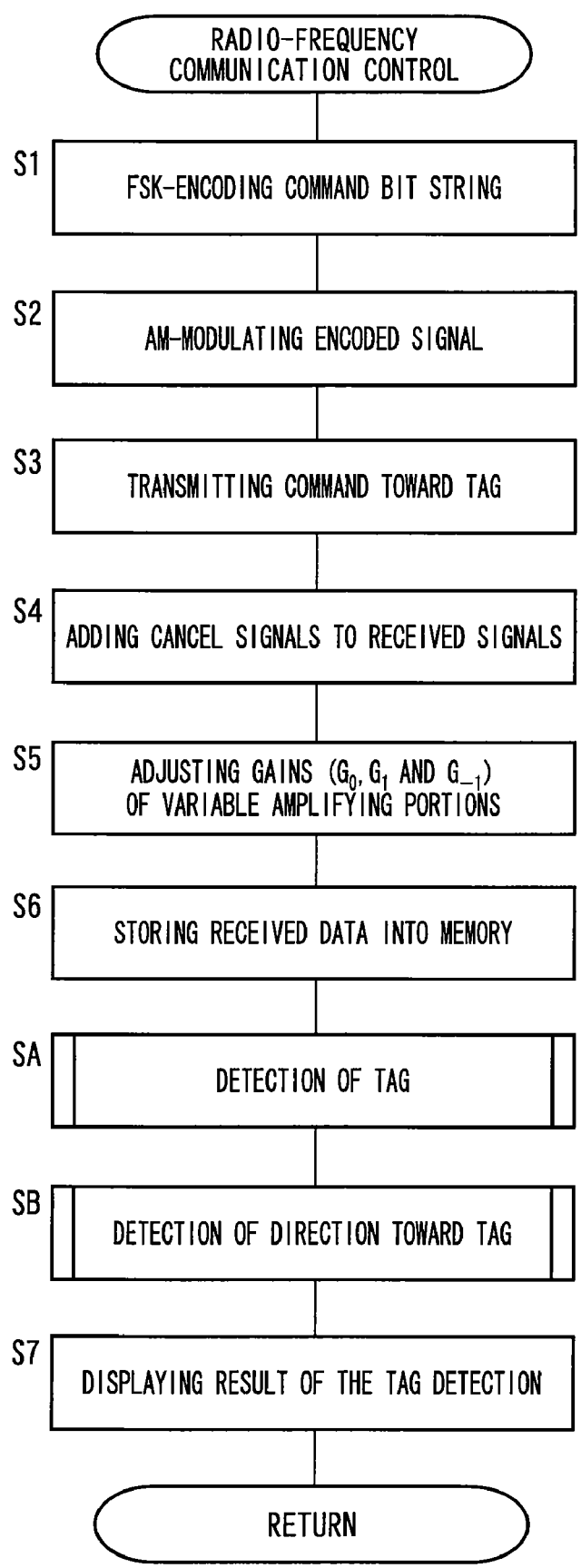
FIG. 9 is a flow chart illustrating a radio-frequency communication control routine executed by a DSP (digital signal processor) of the radio-frequency tag communication device of FIG. 2 for communication with the radio-frequency tag of FIG. 5.

Referring to FIG. 9, there is illustrated a radio-frequency communication control routine (RFID control routine) executed by the DSP 16 of the radio-frequency tag communication device 12 for communication with the radio-frequency tag 14. This control routine is repeatedly executed with a predetermined cycle time.

The present control routine is initiated with step S1 in which a string of command bits corresponding to the transmitted signal to be transmitted to the radio-frequency tag 14 is generated by the transmitted-bit-string generating portion 48, and the generated string of command bits are FSK-encoded by the FSK encoding portion 50. Then, the control flow goes to step S2 in which the signal encoded in step S1 is AM-modulated by the AM modulating portion 52 into the transmitted signal. The control flow then goes to step S3 in which the transmitted signal obtained by AM modulation in step S2 is converted into an analog signal by the transmitted-signal D/A converting portion 18, and is transmitted as the interrogating wave $F_c$ from the transmitter antenna device 26 toward the radio-frequency tag 14, through the converter 22 and transmitted-signal amplifying portion 24. Then, the control flow goes to step S4 corresponding to the canceling portion 32, in which the reply signal transmitted from the radio-frequency tag 14 in response to the interrogating wave $F_c$ is received through the receiver antenna elements 28, and the cancel signal is added to the received signal received by each receiver antenna element 28. The control flow then goes to step S5 in which the amplifying ratios $G_1$, $G_0$ and $G_{-1}$ of the variable amplifying portions 36 are adjusted. Then, the control flow goes to step S6 in which the received signals to which the cancel signals have been added by the canceling portion 32 are applied to the respective received-signal A/D converting portions 38 through the respective down converters 34 and the respective variable amplifying portions 36. The received signals converted into the digital signals by the received-signal A/D converting portions 38 are stored in the memory portion 40. The control flow then goes to step SA to implement a tag detection control routine illustrated in the flow chart of FIG. 10. Then, the control flow goes to step S7 to display a result of the tag detection control on a display portion (not shown), and the present control routine is terminated.

Figure 10:
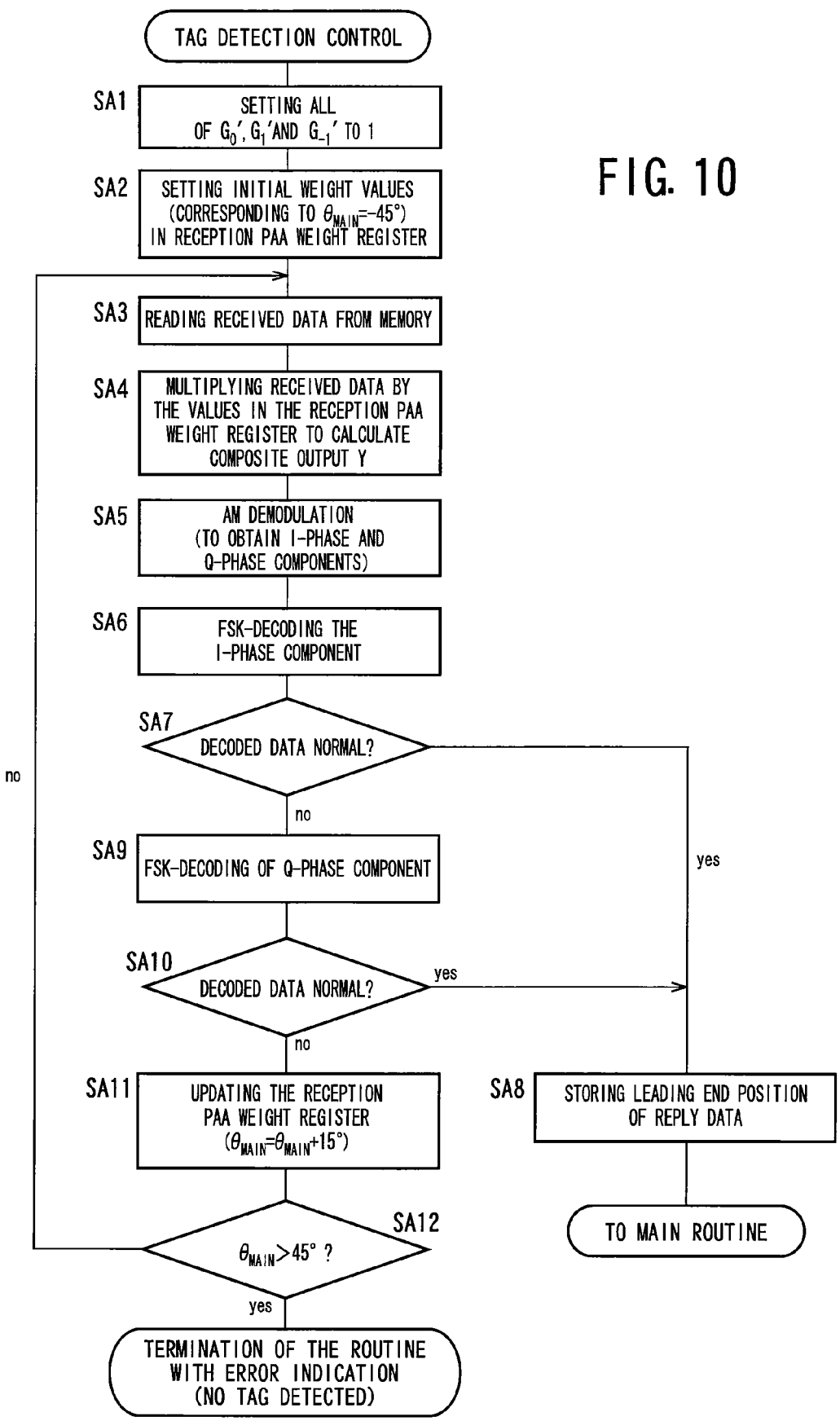
FIG. 10 is a flow chart illustrating a tag detection control routine which is a part of the radio-frequency tag communication control routine illustrated in the flow chart of FIG. 9.

Referring to the flow chart of FIG. 10, there is illustrated the tag detection control routine which is a part of the radio-frequency tag communication control routine illustrated in the flow chart of FIG. 9. This control routine is initiated with step SA1 in which all of the values $G_1'$, $G_0'$ and $G_{-1}'$ which determine the amplifying or attenuating ratios of the gain-difference compensating portions 68 of the AM demodulating portion 56 (the values $G_1'$, $G_0'$ and $G_{-1}'$ being the denominators of the fractions representing the amplifying ratios $1/G_1$, $1/G_0$ and $1/G_{-1}$) are set to "1", to invalidate the functions of the gain-difference compensating portions 68. Then, the control flow goes to step SA2 to set initial weight values in a reception PAA weight register of the PAA processing portion 54, which initial weight values correspond to an angle $\theta_{MAIN}=-45°$ of a main lobe direction. The control flow then goes to step SA3 in which the PAA processing portion 54 reads out from the memory portion 40 the received signals, and then to step SA4 in which the received signals read out by the PAA processing portion 54 from the memory portion 40 are multiplied by the weight values read out from the reception PAA weight register, and the thus multiplied received signals are applied to the received-signal combining portion 70 through the gain-difference compensating portions 68 of the AM demodulating portion 56, to obtain a composite output Y. Then, the control flow goes to step SA5 in which the composite signal Y obtained in step SA4 is converted into the I-phase component (I-phase signal) and the Q-phase component. The control flow then goes to step SA6 in which the IQ selector portion 84 is set to pass the I-phase component, and the I-phase component is FSK-decoded by the FSK decoding portion 58. Then, the control flow goes to step SA7 in which the decoded data obtained in step SA6 are normal or not. If an affirmative determination is obtained in step SA7, the control flow goes to step SA8 in which the reply data, that is, the leading end position of the modulated component modulated by the radio-frequency tag 14 is stored, and the control flow returns to the radio-frequency tag communication control routine of FIG. 9. If a negative determination is obtained in step SA7, the control flow goes to step SA9 in which the IQ selector portion 84 is set to pass the Q-phase component, and the Q-phase component is FSK-decoded by the FSK decoding portion 58. The control flow then goes to step SA10 to determine whether the decoded data obtain in step SA9 are normal or not. If an affirmative determination is obtained in step SA10, the control flow goes to step SA11 in which the weight values in the reception PAA weight register of the PAA processing portion 54 are updated by an amount corresponding to 15° added to the angle $\theta_{MAIN}$ of the main lobe direction. Then, the control flow goes to step SA12 to determine whether the angle $\theta_{MAIN}$ of the main lobe direction is larger than 45°. If a negative determination is obtained in step SA12, the control flow goes back to step SA3 and the subsequent steps. If an affirmative determination is obtained in step SA12, this indicates that the radio-frequency tag 14 has not been detected. In this case, the tag detection routine is terminated with an indication of an error.

Figure 11:
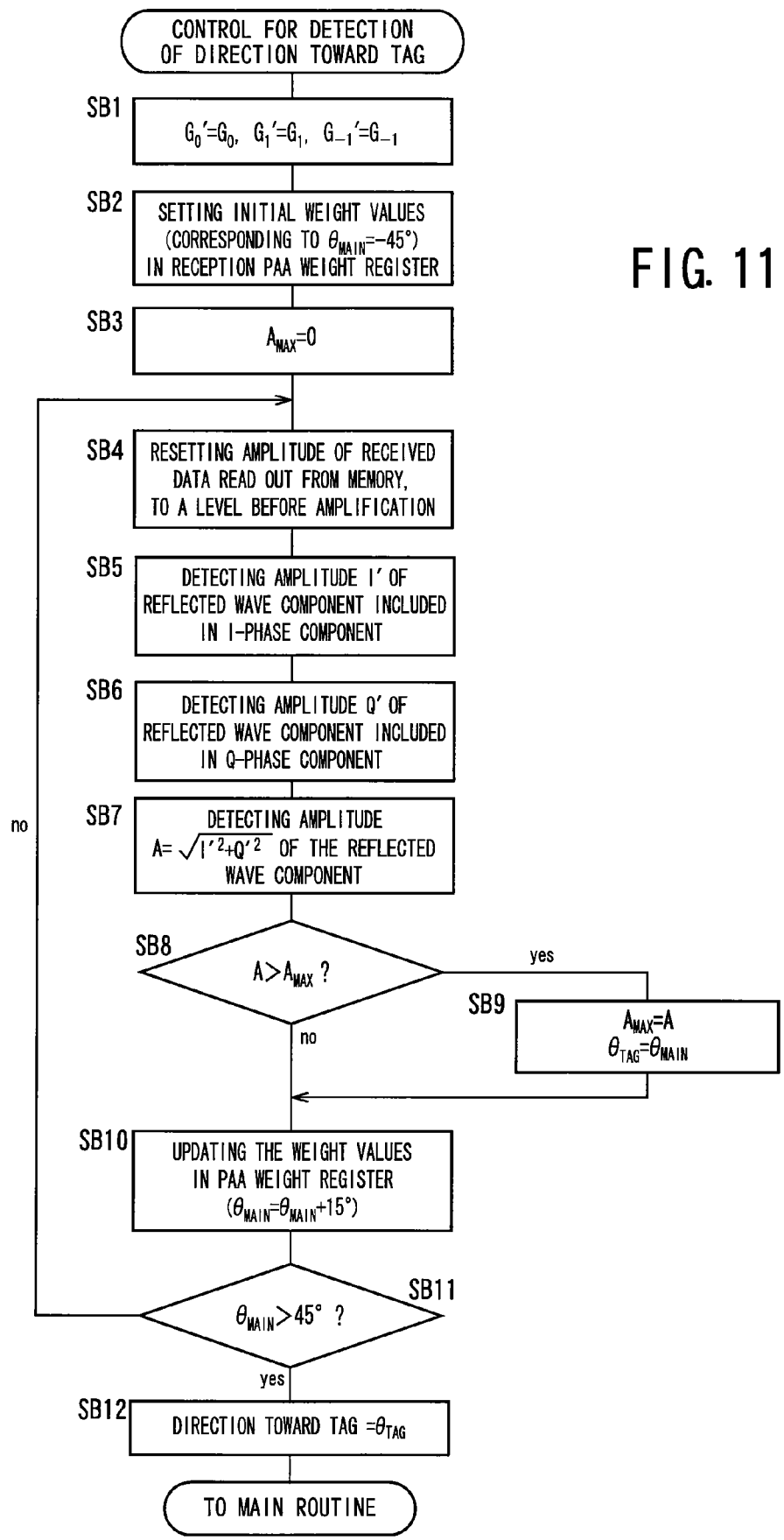
FIG. 11 is a flow chart illustrating a tag direction detecting routine which is another part of the radio-frequency tag communication control routine of FIG. 9.

Referring to the flow chart of FIG. 11, there is illustrated a tag direction detecting routine which is another part of the radio-frequency tag communication control routine of FIG. 9. This control routine is initiated with step SB1 in which the values $G_1'$, $G_0'$ and $G_{-1}'$ which determine the amplifying ratios of the gain-difference compensating portions 68 of the AM demodulating portion 56 are set to be equal to the amplifying ratios $G_1$, $G_0$ and $G_{-1}$ of the corresponding variable amplifying portions 36. Then, the control flow goes to step SB2 to set the initial weight values of the reception PAA weight register of the PAA processing portion 54, which initial weight values correspond to the angle $\theta_{MAIN}=-45°$ of the main lobe direction. The control flow then goes to step SB3 to zero a threshold value $A_{MAX}$. Then, the control flow goes to step SB4 in which the received signals are read out from the memory portion 40 and are applied to the AM demodulating portion 56 through the PAA processing portion 54 so that the received signals are attenuated by the respective gain-difference compensating portions 68. In step SB1, the values $G_1'$, $G_0'$ and $G_{-1}'$ which determine the amplifying ratios of the gain-difference compensating portions 68 of the AM demodulating portion 56 have been set to be equal to the amplifying ratios $G_1$, $G_0$ and $G_{-1}$ of the corresponding variable amplifying portions 36. Accordingly, the amplitudes of the received signals generated by the gain-difference compensating portions 68 are reset to levels before amplification by the variable amplifying portions 36. The control flow then goes to step SB5 corresponding to the reflected-wave-I-phase-component detecting portion 86, to detect the amplitude I' of the modulated component (reflected wave component) which is modulated by the radio-frequency tag 14 and which is included in the I-phase component applied to the direction detecting portion 62 through the received-signal combining portion 70, I-phase converting portion 72, and I-phase BPF 76. Then, the control flow goes to step SB6 corresponding to the reflected-wave-Q-phase-component amplitude detecting portion 88, to detect the amplitude Q' of the modulated component which is modulated by the radio-frequency tag 14 and which is included in the Q-phase component applied to the direction detecting portion 62 through the received-signal combining portion 70, Q-phase converting portion 78 and Q-phase BPF 82. The control flow then goes to step SB7 corresponding to the reflected-wave amplitude detecting portion 90, to calculate an amplitude $A=(I'^2+Q'^2)^{1/2}$ of the reflected wave component, as a square root of a sum of the square of the approximate amplitude value I' of the reflected wave component of the I-phase component detected in step SB5 and the square of the approximate amplitude value Q' of the reflected wave component of the Q-phase component detected in step SB6. Then, the control flow goes to step SB8 to determine whether the amplitude A of the reflected wave component calculated in step SB7 is larger than the threshold value $A_{MAX}$ or not. If an affirmative determination is obtained in step SB8, the control flow goes to step SB9 in which the threshold value $A_{MAX}$ is set to the calculated amplitude value A, and an angle $\theta_{TAG}$ indicative of the direction in which the radio-frequency tag 14 is located is set to the angle $\theta_{MAIN}$. Step SB9 is followed by step SB10. If a negative determination is obtained in step SB8, the control flow goes directly to step SB10 in which the weight values in the reception PAA weight register of the PAA processing portion 54 are updated by an amount corresponding to 15° added to the angle $\theta_{MAIN}$ of the main lobe direction. Then, the control flow goes to step SB11 to determine whether the angle $\theta_{MAIN}$ of the main lobe direction is larger than 45°. If a negative determination is obtained in step SB11, the control flow goes back to step SB4 and the subsequent steps. If an affirmative determination is obtained in step SB11, the control flow goes to step SB12 in which the present angle $\theta_{TAG}$ is determined as the angle indicative of the direction in which the radio-frequency tag 14 is located. In this case, the control flow returns to the radio-frequency tag communication control routine of FIG. 9. It will be understood that steps SA2, SA4, SA11, SB2 and SB10 correspond to the operation of the PAA processing portion 54, while step SA6, SA8 and SA9 correspond to the operation of the FSK decoding portion 58. It will also be understood that steps SA4, SA5 and SB4 correspond to the operation of the AM demodulating portion 56 while step SA1 and SB correspond to the operation of the direction detecting portion 62.

As described above, the radio-frequency tag communication device constructed according to the present embodiment of this invention comprises the receiver antenna device 30 having the plurality of receiver antenna elements 28 for receiving the reply signal from the radio-frequency tag 14, the reception-directivity control portion in the form of the PAA processing portion 54 (steps SA2, SA4, SA11, SB2 and SB10) configured to control the directivity of reception of the receiver antenna device 30, by controlling the phase of the received signal received by each receiver antenna element 28 and which may include the leakage signal (which is a part of the transmitted signal), the modulated-component extracting portion in the form of the reflected-wave-I-phase-component amplitude detecting portion 86 (step SB6) and the reflected-wave-Q-phase-component amplitude detecting portion 88 (step SB7) which are configured to extract the modulated component of the received signal which is modulated by the radio-frequency tag 14, and the direction detecting portion 62 (step SB) configured to detect the direction in which the radio-frequency tag is located or exists, on the basis of the modulated component extracted by the reflected-wave-I-phase-component amplitude detecting portion 86 and the reflected-wave-Q-phase-component detecting portion 88. Thus, the present radio-frequency tag communication device 12 can accurately detect the direction in which the radio-frequency tag 14 is located or exists, on the basis of the reflected wave component which is a part of the reply signal which is modulated and reflected by the radio-frequency tag 14. In other words, the present embodiment provides the radio-frequency tag communication device 12 which permits highly accurate detection of the direction in which the radio-frequency tag 14 is located.

The present embodiment is further arranged such that the direction detecting portion 62 determines, as the direction in which the radio-frequency tag 14 is located, a direction in which the modulated component extracted by the reflected-wave-I-phase-component amplitude detecting portion 86 and the reflected-wave-Q-phase-component detecting portion 88 has a maximum amplitude. Accordingly, the direction in which the radio-frequency tag 14 is located can be detected with high accuracy, by controlling the main lobe direction of the receiver antenna device 30 through the PAA processing portion 54.

The present embodiment is further arranged such that the radio-frequency tag communication device 12 comprises the canceling portion 32 (step S4) configured to generate the cancel signal to be added to the received signal received by each of the plurality of receiver antenna elements 28, for removing from the received signal the leakage signal that is the part of the transmitted signal which part is mixed in the received signal. Accordingly, the leakage signal is removed from the received signal, so that the signal-to-noise ratio of the received signal can be improved, making it possible to increase the maximum distance of communication of the radio-frequency tag communication device 12 with the radio-frequency tag 14.

The present embodiment is further arranged such that the plurality of variable amplifying portions 36 the amplifying ratios of which are variable are provided for amplifying the received signals received by the respective receiver antenna elements 28. Accordingly, the resolution of the plurality of received-signal A/D converting portions 38 provided to convert the received signals received by the respective receiver antenna elements 28 into digital signals can be maximized.

The present embodiment is further arranged such that the plurality of gain-difference compensating portions 68 are provided to change the amplitudes of the received signals respectively amplified by the plurality of variable amplifying portions 36, such that ratios of change of the amplitudes of the received signals are equal to reciprocals of the respective amplifying ratios of the variable amplifying portions 36. In this case, the direction in which the radio-frequency tag is located can be accurately detected with a reduced influence of noises, and without deterioration of the signal-to-noise ratio.

The present embodiment is also arranged such that the direction detecting portion 62 controls the amplifying ratios of the plurality of gain-difference compensating portions 68 such that the received signals received by the plurality of receiver antenna elements 28 have substantially the same amplitude. Accordingly, the direction in which the radio-frequency tag 14 is located can be detected on the basis of the plurality of received signals having substantially the same amplitude.

The present embodiment is further arranged such that the direction detecting portion 62 selects one of the first and second operating modes. In the first operating mode, the amplifying ratios of the gain-difference compensating portions 68 are controlled such that the received signals received by the respective receiver antenna elements have substantially the same amplitude. In the second operating mode, the gain-difference compensating portions 68 are controlled such that the received signals received by the respective receiver antenna elements 28 are amplified by the same amplifying ratio. In this case, the first or second operating mode of the gain-difference compensating portions 68 is selected depending upon whether the radio-frequency tag communication device 12 is operated for radio communication with the radio-frequency tag 14, or for detection of the direction in which the radio-frequency tag 14 is located.

The present embodiment is further arranged such that the radio-frequency tag communication device 12 further comprises the modulated-component-start-position detecting portion in the form of the FSK decoding portion 58 (steps SA6, SA8 and SA9) configured to detect the start position of the modulated component which is included in the received signal and which is modulated by the radio-frequency tag 14, and the reflected-wave-I-phase-component amplitude detecting portion 86 and the reflected-wave-Q-phase-component amplitude detecting portion 88 extract, as the modulated component, a predetermined length portion of the received signal starting at the start position detected by the FSK decoding portion 58. The direction detecting portion 62 detects the direction in which the radio-frequency tag 14 is located, on the basis of an average amplitude of the modulated component which is extracted by the reflected-wave-I-phase-component amplitude detecting portion 86 and the reflected-wave-Q-phase-component amplitude detecting portion 88. Accordingly, the direction in which the radio-frequency tag 14 is located can be detected with high accuracy.

The present embodiment is further arranged such that the AM modulating portion 56 (steps SA4, SA5 and SB5) is configured to convert the received signal received by each of the plurality of receiver antenna elements 28, into the I-phase signal and the Q-phase signal having respective phases perpendicular to each other, and the reflected-wave-I-phase-component amplitude detecting portion 86 and the reflected-wave-Q-phase-component amplitude detecting portion 88 extract the modulated component included in the I-phase signal and the modulated component included in the Q-phase signal, and the direction detecting portion 62 calculate, as the approximate amplitude value of the I-phase signal, an average of the absolute values of amplitude of the modulated component included in the I-phase signal, and an approximate amplitude value of the Q-phase signal, an average of the absolute values of amplitude of the modulated component included in the Q-phase signal. The direction detecting portion 62 determines, as the direction in which the radio-frequency tag 14 is located, the direction in which a square root of a sum of a square of the approximate amplitude value of the I-phase signal and a square of the approximate amplitude value of the Q-phase signal is maximum. In this case, the direction in which the radio-frequency tag 14 is located can be detected with high accuracy.

Figure 12:
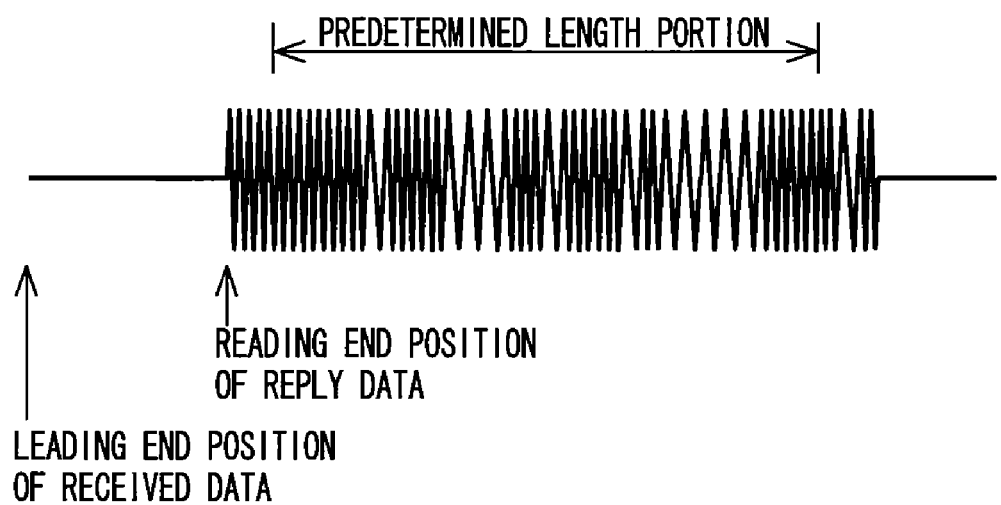
FIG. 12 is a view for explaining a manner of extracting a predetermined length portion (time length portion) of the modulated component of the reply signal received from the radio-frequency tag of FIG. 5.

Referring further to FIGS. 12-15, there will be described in detail another embodiment of the radio-frequency tag communication device 12, which is different from the preceding embodiment in the radio-frequency communication control routine executed by the DSP 16. In the preceding embodiment, the FSK decoding portion 58 functions as the modulated-component-start-position detecting portion configured to detect the start position of the modulated component which is included in the received signal and which is modulated by the radio-frequency tag 14, and each of the reflected-wave-I-phase-component amplitude detecting portion 86 and the reflected-wave-Q-phase-component amplitude detecting portion 88 extracts, as the modulated component, a predetermined length portion of the received signal starting at the start position detected by the FSK decoding portion 58. The direction detecting portion 62 detects the direction in which the radio-frequency tag 14 is located, on the basis of the average amplitude of the modulated components extracted by the reflected-wave-I-phase-component amplitude detecting portion 86 and the reflected-wave-Q-phase-component amplitude detecting portion 88. In the present second embodiment, each of the reflected-wave-I-phase-component amplitude detecting portion 86 and the reflected-wave-Q-phase-component amplitude detecting portion 88 is configured to extract, as the modulated component, a predetermined portion of the entire length of the received signal (reply signal), namely, a predetermined length portion (time length portion) of the received signal, as indicated in FIG. 12. The direction detecting portion 62 is configured to detect the direction in which the radio-frequency tag 14 is located, on the basis of the average amplitudes of the modulated components included in the I-phase and Q-phase signals. In other words, the reflected-wave-I-phase-component amplitude detecting portion 86 and the reflected-wave-Q-phase-component amplitude detecting portion 88 of the direction detecting portion 62 need not be configured to extract the predetermined length portion of the received signal which starts at the detected start position. In view of a possibility that the leading end position of the reply data (reply signal) varies to some extent, the predetermined length portion of the received signal that is to be extracted as the modulated component is preferably shorter than the entire length of the received signal (shorter than the entire reply period), as indicated in FIG. 12. The second embodiment is preferably arranged such that the direction in which the radio-frequency tag 14 is located is estimated on the basis of the modulated components extracted by the reflected-wave-I-phase-component amplitude detecting portion 86 and the reflected-wave-Q-phase-component amplitude detecting portion 88, and then the received signal is decoded by the FSK decoding portion 58. The reception PAA weight values are set in the PAA processing portion 54 in the decoding operation of the FSK decoding portion 58 are set on the basis of the estimated direction toward the radio-frequency tag 14. Thus, the direction in which the radio-frequency tag 14 is located or exists can be detected with high accuracy.

Figure 13:
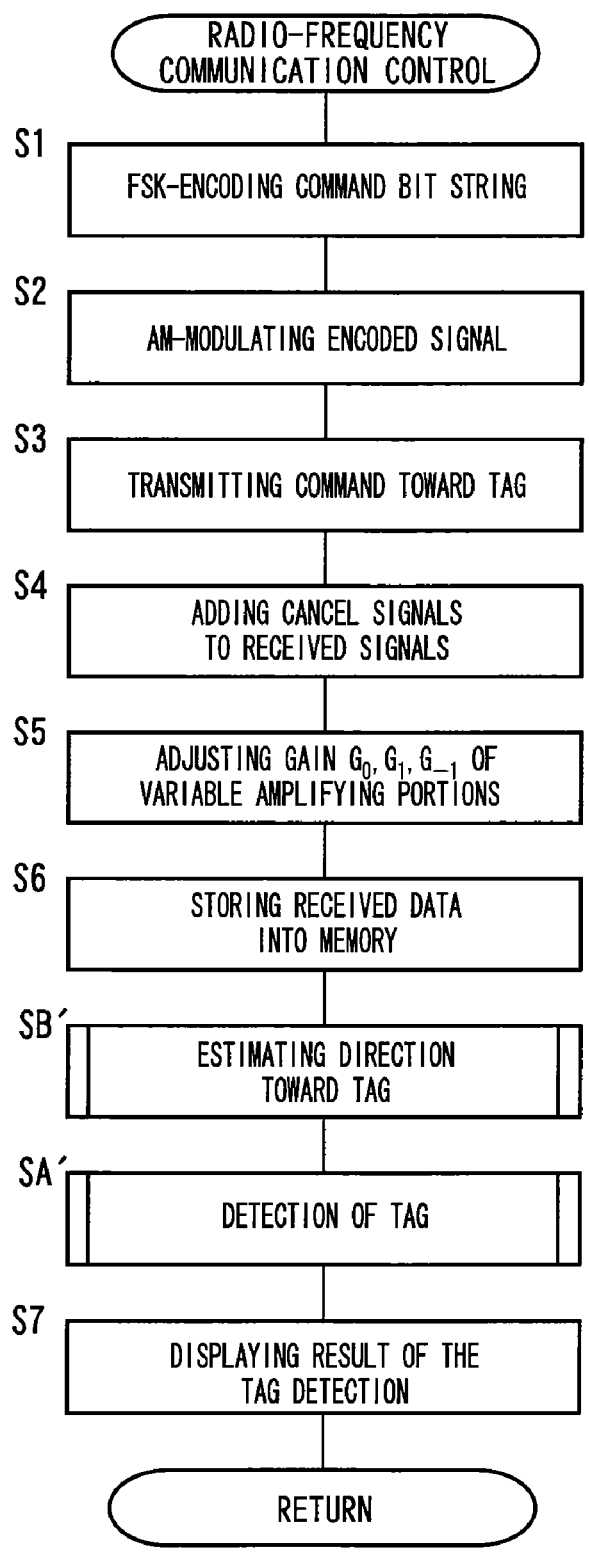
FIG. 13 is a flow chat illustrating a radio-frequency communication control routine executed by the DSP of the radio-frequency tag communication device of FIG. 2 for communication with the radio-frequency tag of FIG. 5, in another embodiment of this invention.
Figure 14:
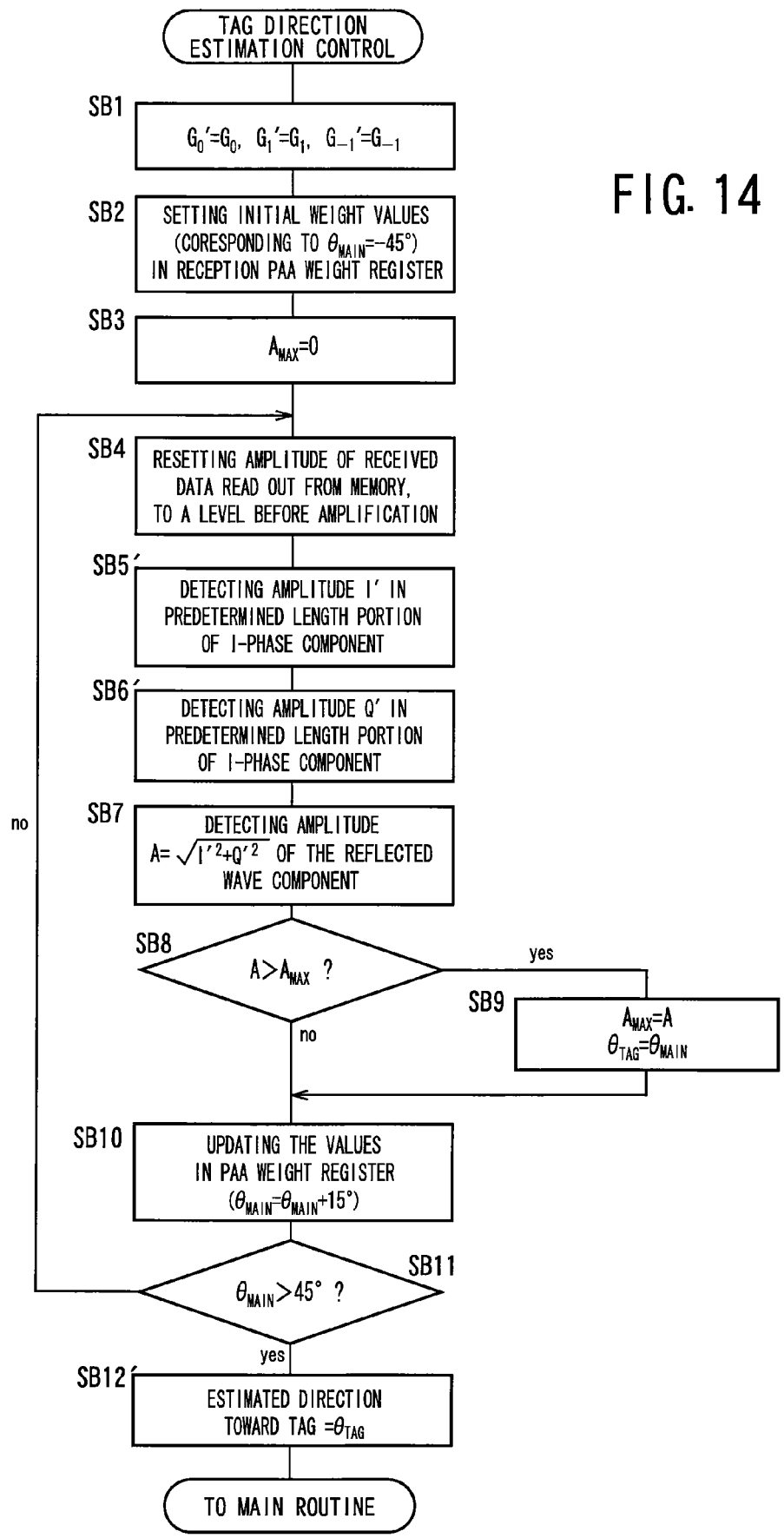
FIG. 14 is a flow chart illustrating a tag direction estimating control routine which is a part of the radio-frequency communication control routine of FIG. 13.
Figure 15:
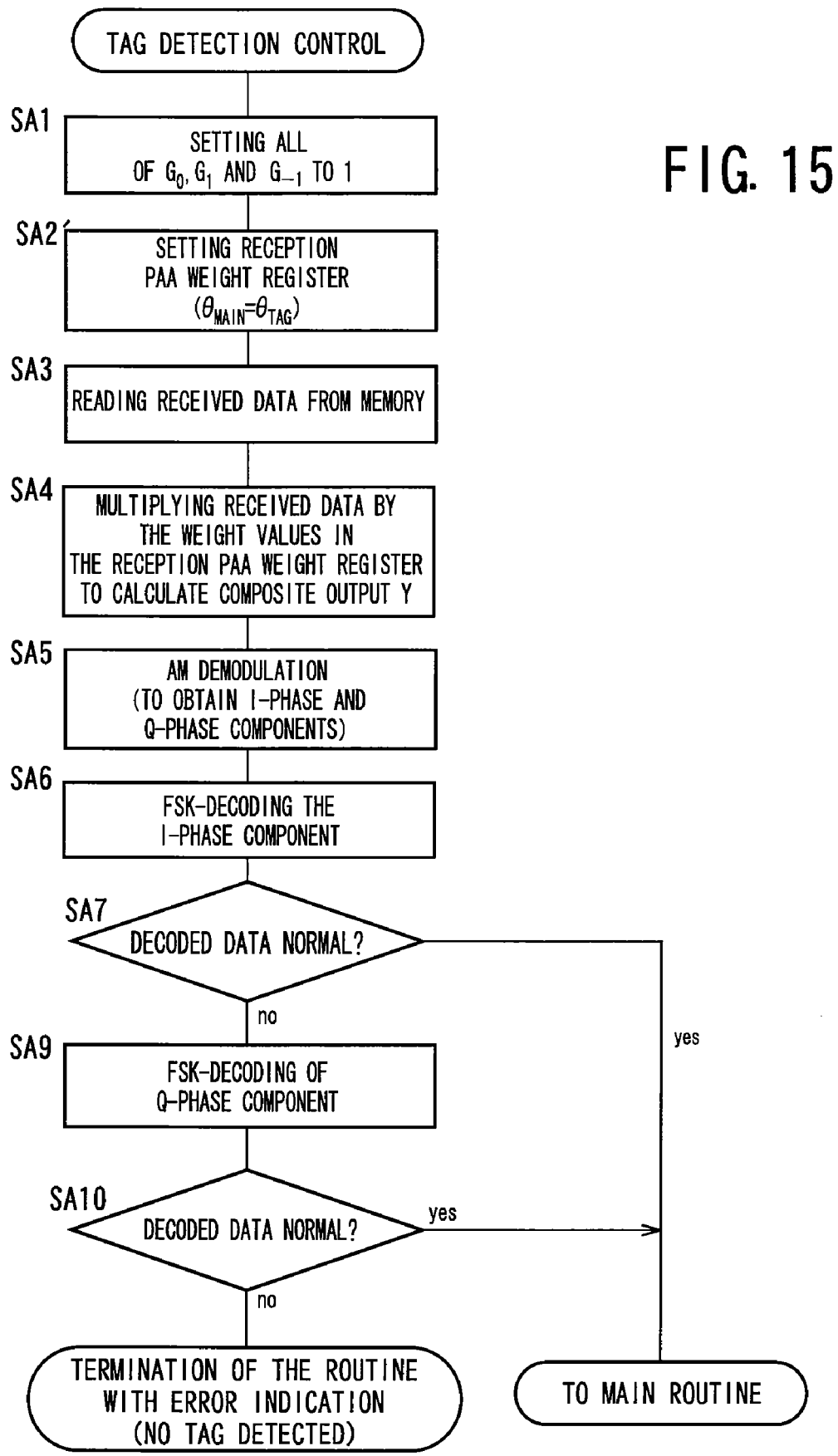
FIG. 15 is a flow chart illustrating a tag detection control routine which is another part of the radio-frequency communication control routine of FIG. 13.

Referring to the flow chart of FIG. 13, there is illustrated a radio-frequency communication control routine executed by the DSP 16 of the radio-frequency tag communication device 12 for communication with the radio-frequency tag 14, in the second embodiment of this invention. This control routine is repeatedly executed with a predetermined cycle time. In the flow chart of FIG. 12 which corresponds to that of FIG. 9, the same step numbers as used in FIG. 9 are used to identify the same steps, which will not be described. The present control routine is different from the control routine of FIG. 9, only in steps SB' and SA' following the step S6. A tag direction estimating control routine as illustrated in FIG. 14 is executed in the step SB', and a tag detection control as illustrated in FIG. 15 is executed in the step SA'. The step SA' is followed by the step S7 described above with respect to the first embodiment.

The flow chart of FIG. 14 illustrates the tag direction estimating control routine which is a part of the radio-frequency communication control routine of FIG. 13. In the flow chart of FIG. 14 which corresponds to that of FIG. 11, the same step numbers as used in FIG. 11 are used to identify the same steps, which will not be described. In the tag direction estimating control routine of FIG. 14, the step SB4 described above with respect to the first embodiment is followed by step SB5' corresponding to the reflected-wave-I-phase-component amplitude detecting portion 86, to detect, as the amplitude I' of the modulated component (reflected wave component) modulated by the radio-frequency tag 14, an average of the absolute values of amplitude of a predetermined portion of the entire length of the I-phase component of the received signal applied to the direction detecting portion 62 through the received-signal combining portion 70, I-phase converting portion 72, and I-phase BPF 76. Then, the control flow goes to step SB6' corresponding to the reflected-wave-Q-phase-component amplitude detecting portion 88, to detect, as the amplitude Q' of the modulated component, an average of the absolute values of amplitude of a predetermined portion of the entire length of the Q-phase component of the received signal applied to the direction detecting portion 62 through the received-signal combining portion 70. Q-phase converting portion 78 and Q-phase BPF 82. The step SB11 described above is followed by step SB12' in which the direction represented by the present angle $\theta_{TAG}$ is determined as the estimated direction in which the radio-frequency tag 14 is located. Then, the control flow returns to the radio-frequency communication control routine of FIG. 13.

The flow chart of FIG. 15 illustrates the tag detection control routine which is another part of the radio-frequency communication control routine of FIG. 13. In the flow chart of FIG. 15 which corresponds to that of FIG. 10, the same step numbers as used in FIG. 10 are used to identify the same steps, which will not be described. In the tag direction estimating control routine of FIG. 15, the step SA1 described above with respect to the first embodiment is followed by step SA2' in which the weight values in the reception PAA weight register of the PAA processing portion 54 are set such that the main lobe direction $\theta_{MAIN}$ is represented by the estimated direction $\theta_{TAG}$ of the radio-frequency tag 14 determined in the above-described step SB12'. The step SA2' is followed by step SA3 and the subsequent steps. If an affirmative determination is obtained in step SA7 or SA10, the control flow returns to the radio-frequency communication control routine of FIG. 13. If a negative determination is obtained in step SA10, this indicates that the radio-frequency tag has not been detected. In this case, the present control routine is terminated with an indication of an error.

In the present second embodiment of this invention, each of the reflected-wave-I-phase-component amplitude detecting portion 86 and the reflected-wave-Q-phase-component amplitude detecting portion 88 extracts, as the modulated component modulated by the radio-frequency tag 14, a predetermined portion of an entire length of the received signal received by each receiver antenna element 28 of the receiver antenna device 30, and the direction detecting portion 62 detects the direction in which the radio-frequency tag 14 is located, on the basis of an average amplitude of the modulated component extracted by the reflected-wave-I-phase-component amplitude detecting portion 86 and the reflected-wave-Q-phase-component amplitude detecting portion 88. Accordingly, the direction in which the radio-frequency tag 14 is located can be detected with high accuracy.

While the preferred embodiments of the present invention have been described above in detail by reference to the drawings, it is to be understood that the present is not limited to the illustrated embodiments, but may be otherwise embodied.

In the preceding embodiments, the PAA processing portion 54, the AM demodulating portion 56, FSK decoding portion 58, the direction detecting portion 62, etc. are functional portions of the DSP 16 of the radio-frequency tag communication device 12. However, these functional portions may be replaced by respective discrete control devices, which may be controlled by either digital or analog signal processing operations.

In the preceding embodiments, the radio-frequency tag communication device 12 is provided with the transmitter antenna device 26 having a single transmitter antenna element and the receiver antenna device 30 having three receiver antenna element 28, that is, only the receiver antenna device 30 is an array antenna device. However, the radio-frequency tag communication device 12 may be provided with a transmitter array antenna device having a plurality of transmitter antenna elements, as well as the receiver array antenna device. Further, the radio-frequency tag communication device 12 may be provided with a common transmitter/receiver array antenna device having a plurality of common transmitter/receiver antenna elements for transmitting the transmitted signal and receiving the reply.

It is to be understood that this invention may be embodied with various other changes which may occur to those skilled in the art, without departing from the spirit and scope of the invention.

What is claimed is:

1. A radio-frequency tag communication device arranged to transmit a transmitted signal toward a radio-frequency tag and to receive a reply signal transmitted from said radio-frequency tag in response to said transmitted signal, for thereby effecting radio communication with said radio-frequency tag, said radio-frequency tag communication device comprising:
    a receiver portion including a receiver antenna device which has a plurality of receiver antenna elements for receiving said reply signal from said radio-frequency tag;
    a reception-directivity control portion configured to control a directivity of reception of said receiver portion, by controlling a phase of a received signal which is received by each of said plurality of receiver antenna elements and which may include a leakage signal which is a part of said transmitted signal;
    a modulated-component extracting portion configured to extract a modulated component of said received signal which is modulated by said radio-frequency tag; and
    a direction detecting portion configured to detect a direction in which said radio-frequency tag is located, on the basis of said modulated component extracted by said modulated-component extracting portion.

2. The radio-frequency tag communication device according to claim 1, wherein said direction detecting portion determines, as said direction in which said radio-frequency tag is located, a direction in which the modulated component extracted by said modulated-component extracting portion has a maximum amplitude.

3. The radio-frequency tag communication device according to claim 1, further comprising a canceling portion configured to generate a cancel signal to be added to said received signal received by each of said plurality of receiver antenna elements, for removing from said received signal said leakage signal that is the part of said transmitted signal which part is mixed in said received signal.

4. The radio-frequency tag communication device according to claim 1, wherein said receiver portion includes a plurality of variable amplifying portions amplifying ratios of which are variable and which are configured to amplify the received signals respectively received by said plurality of receiver antenna elements.

5. The radio-frequency tag communication device according to claim 4, wherein said receiver portion further includes a plurality of gain-difference compensating portions configured to change amplitudes of the received signals respectively amplified by said plurality of variable amplifying portions, such that ratios of change of the amplitudes of the received signals are equal to reciprocals of said amplifying ratios of said plurality of variable amplifying portions.

6. The radio-frequency tag communication device according to claim 4, wherein said direction detecting portion controls amplifying ratios of said plurality of variable amplifying portions such that the received signals received by said plurality of receiver antenna elements have substantially the same amplitude.

7. The radio-frequency tag communication device according to claim 6, wherein said direction detecting portion selects one of a first operating mode and a second operating mode of said variable amplifying portions, the amplifying ratios of said variable amplifying portions being controlled in said first operating mode such that the received signals received by the respective receiver antenna elements have substantially the same amplitude, and said variable amplifying portions being controlled in said second operating mode such that the received signals received by the respective receiver antenna elements are amplified by the same amplifying ratio.

8. The radio-frequency tag communication device according to claim 1, further comprising a modulated-component-start-position detecting portion configured to detect a start position of said modulated component which is included in said received signal and which is modulated by said radio-frequency tag, and wherein said modulated-component extracting portion extracts, as said modulated component, a predetermined length portion of said received signal starting at said start position detected by said modulated-component-start-position detecting portion, and said direction detecting portion detects the direction in which said radio-frequency tag is located, on the basis of an average amplitude of said modulated component extracted by said modulated-component extracting portion.

9. The radio-frequency device according to claim 1, wherein said modulated-component extracting portion extracts, as said modulated component modulated by said radio-frequency tag, a predetermined portion of an entire length of said received signal received by each of said plurality of receiver antenna elements of said receiver portion, and said direction detecting portion detects the direction in which said radio-frequency tag is located, on the basis of an average amplitude of said modulated component extracted by said modulated-component extracting portion.

10. The radio-frequency tag communication device according to claim 1, wherein said receiver portion further includes a demodulating portion configured to convert said received signal received by each of said plurality of receiver antenna elements, into an I-phase signal and a Q-phase signal having respective phases perpendicular to each other, and wherein said modulated-component extracting portion extracts the modulated component included in said I-phase signal and the modulated component included in said Q-phase signal, and said direction detecting portion calculating, as an approximate amplitude value of said I-phase signal, an average of absolute values of amplitude of the modulated component included in said I-phase signal, and an approximate amplitude value of said Q-phase signal, an average of absolute values of amplitude of the modulated component included in said Q-phase signal, said direction detecting portion determining, as said direction in which the radio-frequency tag is located, a direction in which a square root of a sum of a square of said approximate amplitude value of said I-phase signal and a square of said approximate amplitude value of said Q-phase signal is maximum.

* * * * *